(12) United States Patent
Orikasa

(10) Patent No.: US 9,158,485 B2
(45) Date of Patent: Oct. 13, 2015

(54) IMAGE PROCESSING DEVICE THAT PERFORMS IMAGE PROCESSING FOR VARIABLE PRINTING AND HOST DATA GENERATING DEVICE

(75) Inventor: Daisuke Orikasa, Ibaraki-ken (JP)

(73) Assignee: RISO KAGAKU CORPORATION, Tokyo (JP)

( * ) Notice: Subject to any disclaimer, the term of this patent is extended or adjusted under 35 U.S.C. 154(b) by 30 days.

(21) Appl. No.: 13/528,267

(22) Filed: Jun. 20, 2012

(65) Prior Publication Data
US 2012/0327436 A1    Dec. 27, 2012

(30) Foreign Application Priority Data

Jun. 23, 2011 (JP) ................ P2011-139540
Nov. 22, 2011 (JP) ................ P2011-254901
Apr. 10, 2012 (JP) ................ P2012-089199

(51) Int. Cl.
*G06F 3/12* (2006.01)

(52) U.S. Cl.
CPC .............. *G06F 3/122* (2013.01); *G06F 3/1243* (2013.01); *G06F 3/1247* (2013.01); *G06F 3/1286* (2013.01)

(58) Field of Classification Search
CPC ......... G06K 1/00; G06F 3/121; G06F 3/1243; G06F 3/1285
See application file for complete search history.

(56) References Cited

U.S. PATENT DOCUMENTS

| | | | | |
|---|---|---|---|---|
| 6,172,765 | B1 * | 1/2001 | Kawamoto | 358/1.2 |
| 7,747,574 | B1 * | 6/2010 | Svendsen | 707/640 |
| 2007/0285681 | A1 * | 12/2007 | Hayakawa | 358/1.2 |
| 2010/0202008 | A1 * | 8/2010 | Aronshtam et al. | 358/1.15 |
| 2011/0013209 | A1 * | 1/2011 | Yamazaki | 358/1.9 |

FOREIGN PATENT DOCUMENTS

JP    2011-022878    2/2011

* cited by examiner

*Primary Examiner* — Nicholas Pachol
*Assistant Examiner* — Christopher D Wait
(74) *Attorney, Agent, or Firm* — Greenblum & Bernstein, P.L.C.

(57) ABSTRACT

An image processing device includes an image data generator generating static part data, image data of static part common to plural pages, and variable part data for each page, image data of variable part varying for each page, at specified resolution based on variable printing data, a static part data storage unit storing static part data, and a data merge unit combining static part data stored in the static part data storage unit and variable part data, and the image data generator generates, when the amount of the static part data at specified resolution exceeds the capacity of the static part data storage unit, static part data having at least part of resolution changed from the specified resolution so that the data amount does not exceed the capacity of the static part data storage unit and causes the static part data storage unit to store the generated static part data.

5 Claims, 15 Drawing Sheets

FIG. 2

FIRST PAGE

ABC —Ob1

BILL

Mr. X.X

We charge you as follows.

| MONTH | CONTENTS | AMOUNT |
|---|---|---|
| JAN | OOO | ¥1,000 |
| FEB | OOO | ¥1,000 |
| MAR | OOO | ¥1,000 |
| APR | OOO | ¥1,000 |

Ob2

SECOND PAGE

ABC —Ob1

BILL

Ms. Y.Y

We charge you as follows.

| MONTH | CONTENTS | AMOUNT |
|---|---|---|
| JAN | △△△ | ¥2,000 |
| FEB | OOO | ¥1,000 |
| MAR | OOO | ¥1,000 |
| APR | ××× | ¥3,000 |

Ob2

THIRD PAGE

ABC —Ob1

BILL

Mr. Z.Z

We charge you as follows.

| MONTH | CONTENTS | AMOUNT |
|---|---|---|
| JAN | OOO | ¥1,000 |
| FEB | ××× | ¥3,000 |
| MAR | OOO | ¥1,000 |
| APR | △△△ | ¥2,000 |

OBJECT SELECTION — 70

OBJECT #1

*ABC*

BILL

Mr. X.X

We charge you as follows.

| MONTH | CONTENTS | AMOUNT |
|---|---|---|
| JAN | OOO | ¥1,000 |
| FEB | OOO | ¥1,000 |
| MAR | OOO | ¥1,000 |
| APR | OOO | ¥1,000 |

OBJECT#2

— 71

IMAGE INFORMATION — 72

| OBJECT | RESOLUTION (dpi) | NUMBER OF GRADATIONS(bit) |
|---|---|---|
| OBJECT#1 | 600×600 | 8 |
| OBJECT#2 | 600×600 | 8 |

IMAGE TRANSFER PROCESSING — 73

☑ OBJECT#1
☑ OBJECT#2 — 75

PERCENTAGE IN CACHE — 74

OBJECT#1: [50] % — 76
OBJECT#2: [50] % — 76

[ OK ]   [ CANCEL ]

IMAGE PROCESSING DEVICE THAT PERFORMS IMAGE PROCESSING FOR VARIABLE PRINTING AND HOST DATA GENERATING DEVICE

BACKGROUND OF THE INVENTION

1. Technical Field

The present invention relates to an image processing device that performs image processing for variable printing and a host data generating device.

2. Background Arts

Conventional image processing devices perform rasterization to transfer a page description language (PDL) into bitmap image data and also perform predetermined processing on the bitmap image data to generate image data for printing.

Such an image processing device sometimes performs image processing for variable printing. In variable printing, variable parts that vary from page to page are replaced with other and then printed while a static part common to a plurality of pages is printed as it is. Japanese Patent Application Laid-Open No. 2011-22878 discloses an image processing device such that, at the time of image processing for variable printing, as to a static part, processing such as rasterization is not performed each time and image data of the static part (static part data) obtained at first is saved in a dedicated region of a memory and this data is reused. Due to this, image processing is performed efficiently and variable printing is performed at a high speed.

SUMMARY OF THE INVENTION

However, there is a limit to the capacity of the dedicated region of the memory for saving the static part data in the image processing device. When the data amount of the static part data exceeds the capacity of the dedicated region, the image processing device performs the processing such as rasterization also on the static part each time, and therefore the processing efficiency is reduced.

The present invention has been made in view of the above-mentioned problem and an object thereof is to provide an image processing device and a host data generating device capable of preventing the efficiency of image processing for variable printing from decreasing.

In order to achieve the above-mentioned object, an image processing device according to an embodiment of the present invention includes: an image data generator configured to generate static part data, which is image data of a static part in a variable document, and a variable part data, which is image data of a variable part, at a specified resolution based on variable printing data a static part data storage unit configured to store the static part data; and a data merge unit configured to merge the static part data stored in the static part data storage unit and the variable part data. The image data generator changes, when a data amount of the static part data at the specified resolution exceeds a capacity of the static part data storage unit, the specific resolution of at least part of the static part data to a resolution so that the data amount of the static part data is equal to or less than the capacity of the static part data storage unit, and then causes the static part data storage unit to store the static part data.

An image processing device according to another embodiment of the present invention includes: an image data generator configured to generate static part data, which is image data of a static part in a variable document, and variable part data, which is image data of a variable part, based on variable printing data; a static part data storage unit configured to store at least part of the static part data an auxiliary storage unit including a storage device different from that of the static part data storage unit and capable of storing at least part of the static part data; and a data merge unit configured to merge at least part of the static part data stored in the static part data storage unit or in the auxiliary storage unit and the variable part data The image data generator causes the auxiliary storage unit to store at least part of the static part data that the static part data storage unit is not capable of storing because of capacity shortage.

A host data generating device according to an embodiment of the present invention is a host data generating device that generates variable printing data in a PDL format based on variable document data having a static part and a variable part and transmits the variable printing data to an image processing device, the image processing device having an image data generator configured to generate image data of the static part and the variable part based on the variable printing data and a static part data storage unit configured to store static part data for reuse, which is image data of the static part, and the host data generating device includes: an image transfer processor configured to perform, when a data amount of the static part data generated in the image data generator exceeds a capacity of the static part data storage unit, image transfer processing on the static part in the variable document data so that the data amount of the static part data is equal to or less than the capacity of the static part data storage unit; and a printing data generator configured to generate the variable printing data in the PDL format based on the variable document data after the image transfer processing by the image transfer processor.

BRIEF DESCRIPTION OF THE DRAWINGS

FIG. 2 is a diagram showing an example of a variable document.

FIG. 12 is a diagram showing an example of an object selection screen.

DESCRIPTION OF THE EMBODIMENTS

There will be explained hereinafter several embodiments of the present invention with reference to the drawings. Throughout each drawing, the same or equivalent symbols are assigned to the same or equivalent components, respectively, and explanations for their components are omitted or simplified.

(First Embodiment)

Figure 1:
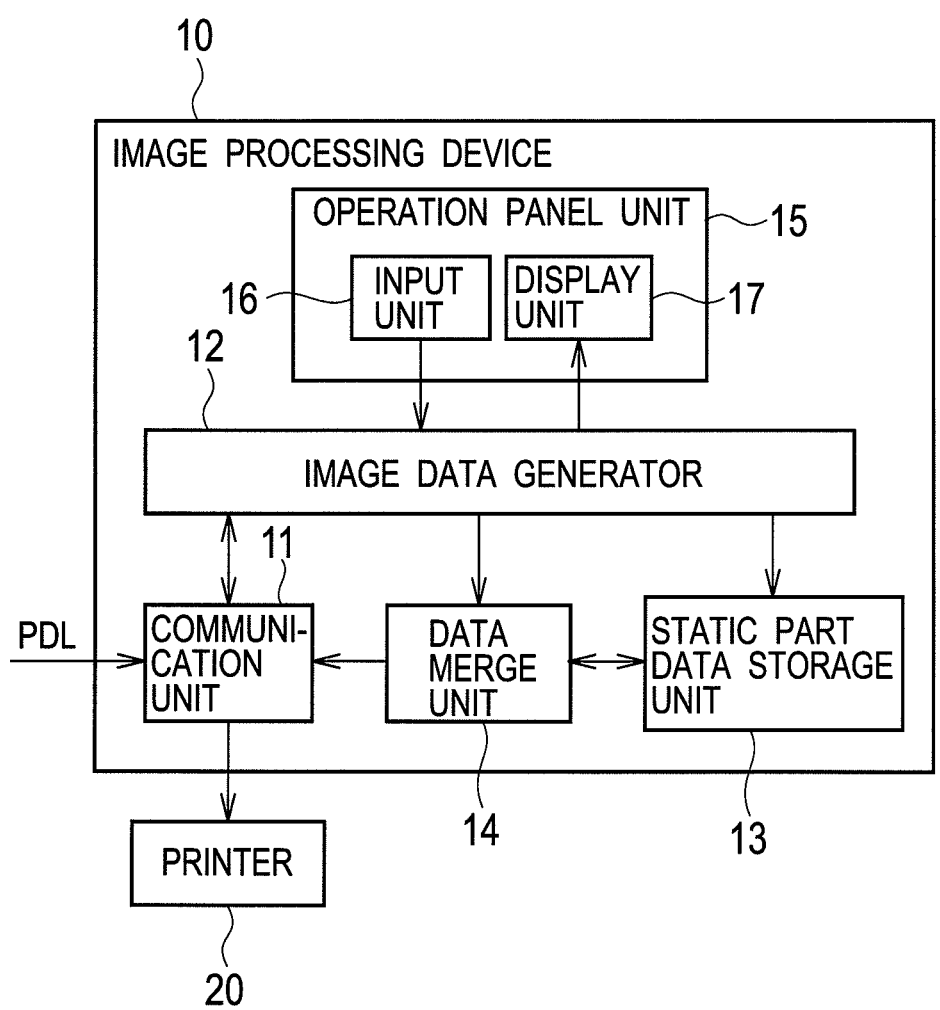
FIG. 1 is a block diagram showing a configuration of a printing system according to a first embodiment.

FIG. 1 is a block diagram showing a configuration of a printing system according to a first embodiment As shown in FIG. 1, the printing system according to the first embodiment includes an image processing device 10 and a printer 20.

The image processing device 10 is configured to generate image data in a format used for printing in the printer 20 based on a PDL input from an external PC (Personal Computer) etc.

The printer 20 is configured to perform printing based on the image data input from the image processing device 10. It is assumed that the printer 20 is an inkjet printer having an inkjet head corresponding to each color of cyan (C), magenta (M), yellow (Y), and black (K).

The image processing device 10 includes a communication unit 11, an image data generator 12, a static part data storage unit 13, a data merge unit 14, and an operation panel unit 15.

The communication unit 11 is configured to perform communication and data transfer with external equipment. The communication unit 11 is configured so as to have, for example, a LAN interface.

The image data generator 12 is configured to check the syntax of the PDL input via the communication unit 11, analyze each instruction described in the PDL and generate an intermediate format necessary for rasterization (drawing) for each object. The intermediate format is data in the stage before being finally transferred into data to be output to the printer 20. After that, the image data generator 12 rasterizes the intermediate format and generates bitmap image data in the CMYK format. Then, the image data generator 12 transfers the bitmap image data in the CMYK format into image data in the format used for printing in the printer 20. Specifically, the image data in the format used for printing in the printer 20 is data (drop data) indicating the number of drops ejected to each pixel from the inkjet head of each color of CMYK. The image data generator 12 performs multi-level error diffusion processing etc. on the bitmap image data and generates image data for printing, which is drop data.

The image data generator 12 generates image data (static part data) for printing of a static part by performing rasterization etc. of the static part that appears first when a PDL for variable printing (variable printing data) is input to the image processing device 10 and causes the static part data storage unit 13 to store the generated image data As to the static part that appears later, the static part data in the static part data storage unit 13 is reused, and therefore the image data generator 12 does not perform processing, such as rasterization. A static part includes one or more objects included in common in a plurality of pages. Here, the image data generator 12 determines whether or not a data amount Da of the static part data at a specified resolution Ra exceeds a capacity Cth of the static part data storage unit 13 before generating the static part data. When the data amount Da exceeds the capacity Cth, the image data generator 12 calculates a storage-capable resolution Rb (<Ra) at which the data amount of the static part data can be reduced to or less than the capacity Cth. Then, the image data generator 12 generates static part data after changing the resolution from the specified resolution Ra to the storage-capable resolution Rb and causes the static part data storage unit 13 to store the generated static part data After causing the static part data storage unit 13 to store the static part data to be reused, the image data generator 12 generates image data (variable part data) for printing of a variable part by performing rasterization etc. of only the variable part of each page.

Here, the resolution includes a resolution in the transverse axis (X-axis) direction (X-axis resolution) of an image and a resolution in the vertical axis (Y-axis) direction (Y-axis resolution). In the following, for the sake of convenience of explanation, explanation is given on the assumption that both the X-axis resolution and the Y-axis resolution are the same. That is, the specified resolution Ra described previously is a value common to both the X-axis direction and the Y-axis direction and both the X-axis resolution and the Y-axis resolution of the image data at the specified resolution Ra are Ra. This is the same also in the case of the storage-capable resolution Rb described previously and a minimum resolution Rmin, to be described later.

FIG. 2 is a diagram showing an example of a document of target of variable printing (variable document). In FIG. 2, objects Ob1 and Ob2 that appear on each page form static parts. Objects, such as a sentence and lines of a table, common to each page may form static parts. In general, an object of the static part appears across a plurality of pages as in the example of FIG. 2, but there is a variable document in which the same object of the static part exists in plurality on the same page. The object of "Address" and the objects within the "Contents" box and "Amount" box in the table that vary from page to page form variable parts.

The static part data storage unit 13 is configured to store static part data generated in the image data generator 12 in the processing on a PDL for variable printing. When a series of processing on the target PDL is completed, the static part data within the static part data storage unit 13 is deleted. Consequently, while the image processing for the series of variable printing for one job is being performed, the static part data corresponding to the job is stored in the static part data storage unit 13 in association with a unique ID for each object, as will be described later.

When a PDL for variable printing is input to the image processing device 10, the data merge unit 14 merges the static part data within the static part data storage unit 13 and variable part data of each page sequentially generated in the image data generator 12 to form image data for printing of each page.

The operation panel unit 15 is configured to receive an input operation of a user and at the same time, displays various kinds of screens etc. The operation panel unit 15 functions to receive an input operation relating to the image processing device 10 and the printer 20 and to display various kinds of screens etc. The operation panel unit 15 includes an input unit 16 and a display unit 17.

The input unit 16 is configured to receive an input operation by a user and outputs an operation signal in accordance with the operation. The input unit 16 has an operation button, a touch panel, etc.

The display unit 17 is configured to display various kinds of screens etc. The display unit 17 includes a liquid crystal display panel etc.

The image processing device 10 includes a CPU, RAM, ROM, a storage device such as hard disk, etc. When the CPU executes programs stored in the storage device such as a hard disk, the functions of the image data generator 12 and the data merge unit 14 are implemented. The static part data storage unit 13 is configured as a dedicated region provided in the RAM that the CPU can access at a high speed. The RAM is also used as a program region of the OS, applications, etc., and therefore there is a limit to the capacity Cth that can be used as a dedicated region configuring the static part data storage unit 13.

Next, the operation of the image processing device 10 is explained.

Figure 3:
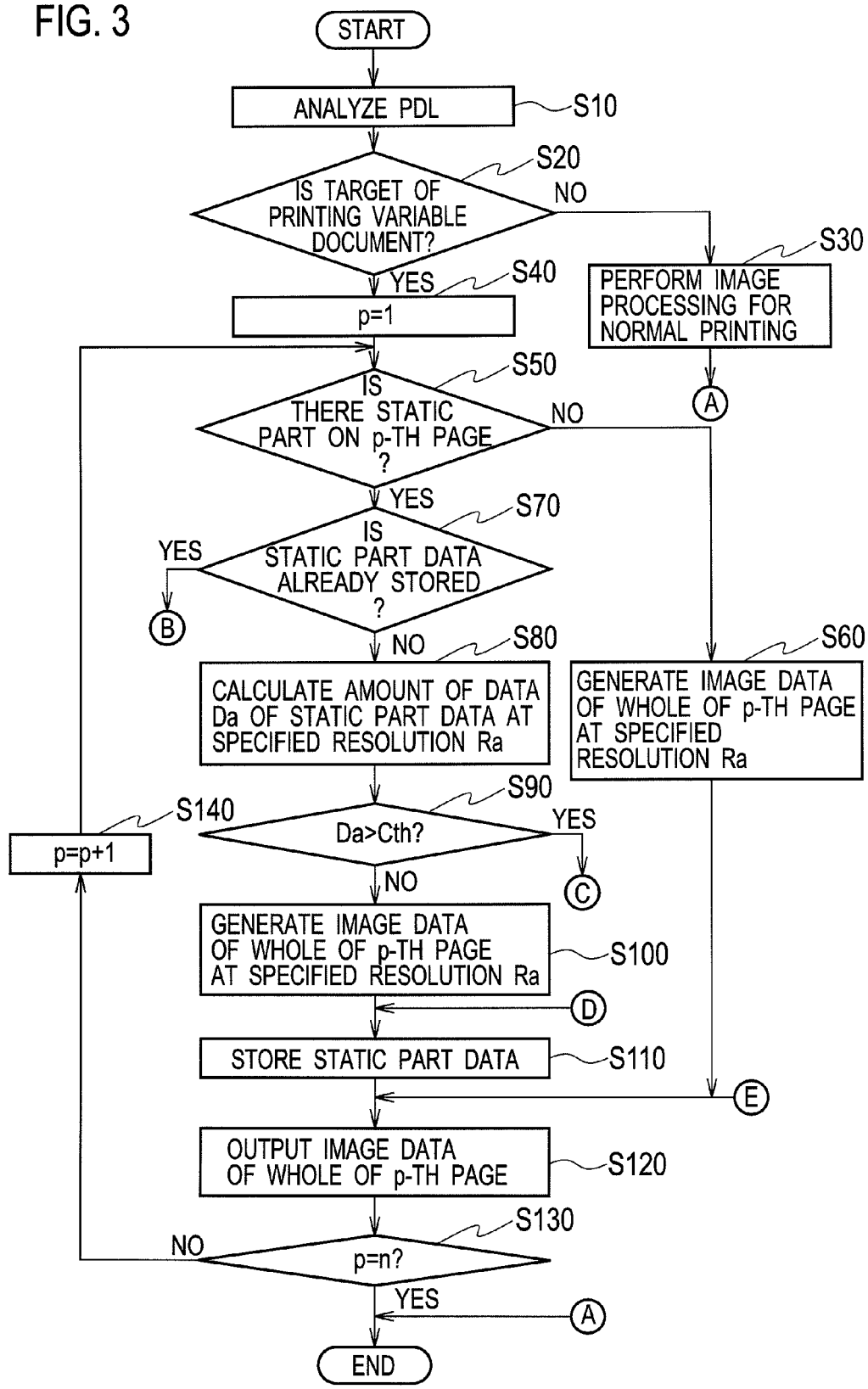
FIG. 3 is a flowchart for explaining an operation of an image processing device in the first embodiment.
Figure 4:
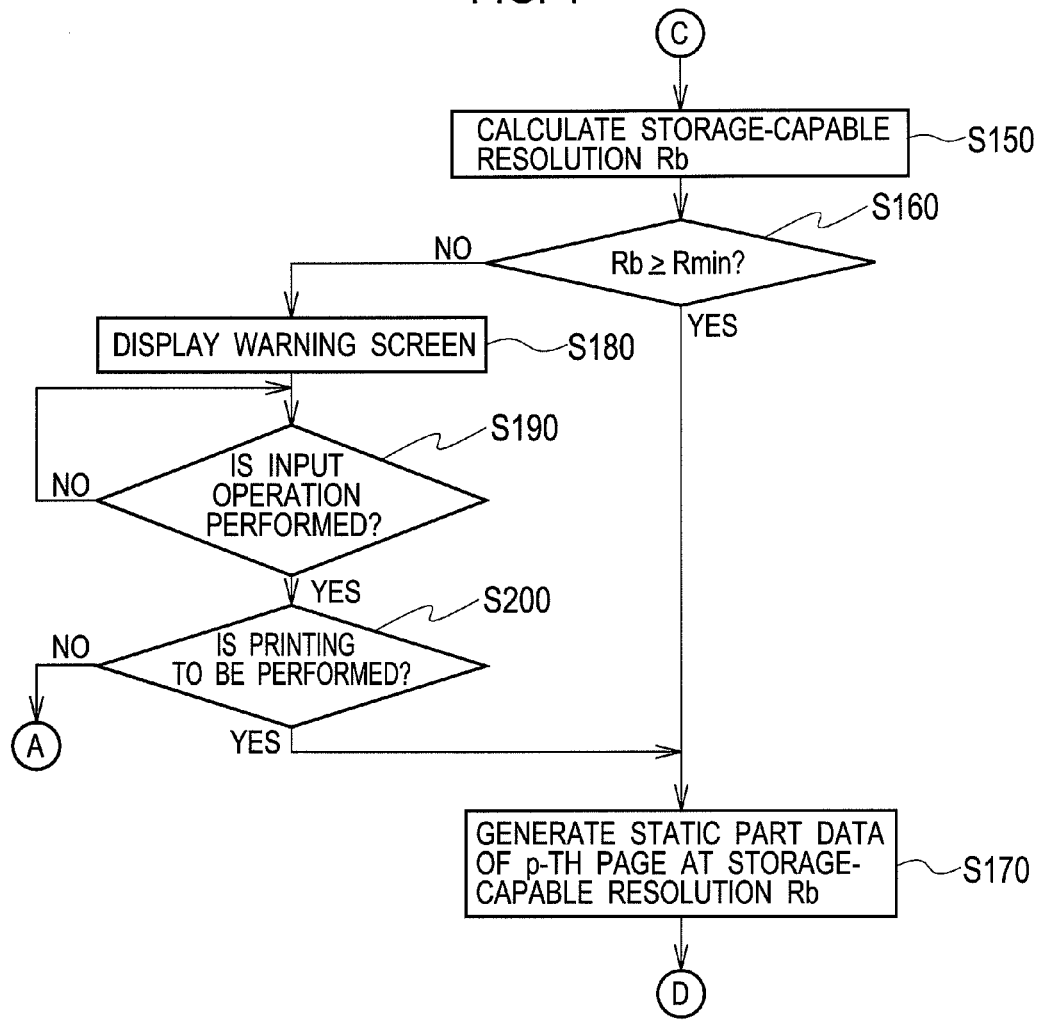
FIG. 4 is the flowchart for explaining the operation of the image processing device in the first embodiment.
Figure 5:
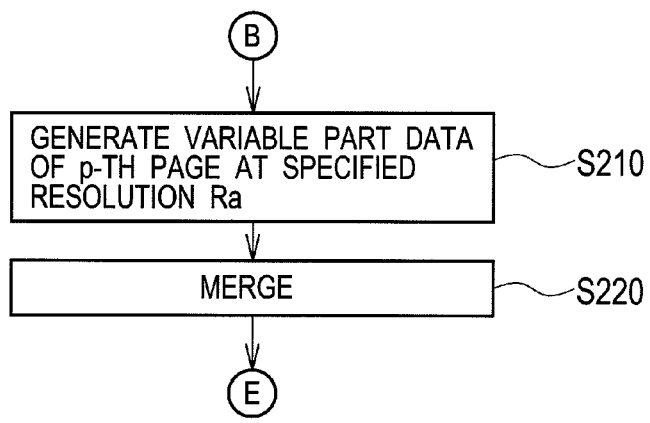
FIG. 5 is the flowchart for explaining the operation of the image processing device in the first embodiment.

FIG. 3 to FIG. 5 are a flowchart for explaining the operation of the image processing device 10. The processing of the flowchart of FIG. 3 to FIG. 5 is started when a PDL is input to the image processing device 10.

At step S10 of FIG. 3, the image data generator 12 checks whether or not the input PDL conforms to the syntax of PDL and at the same time, analyzes the PDL and acquires necessary information, such as the total number of pages configuring the document.

Next, at step S20, the image data generator 12 determines whether or not the target of printing is a variable document based on the analysis result of the PDL.

Figure 6:
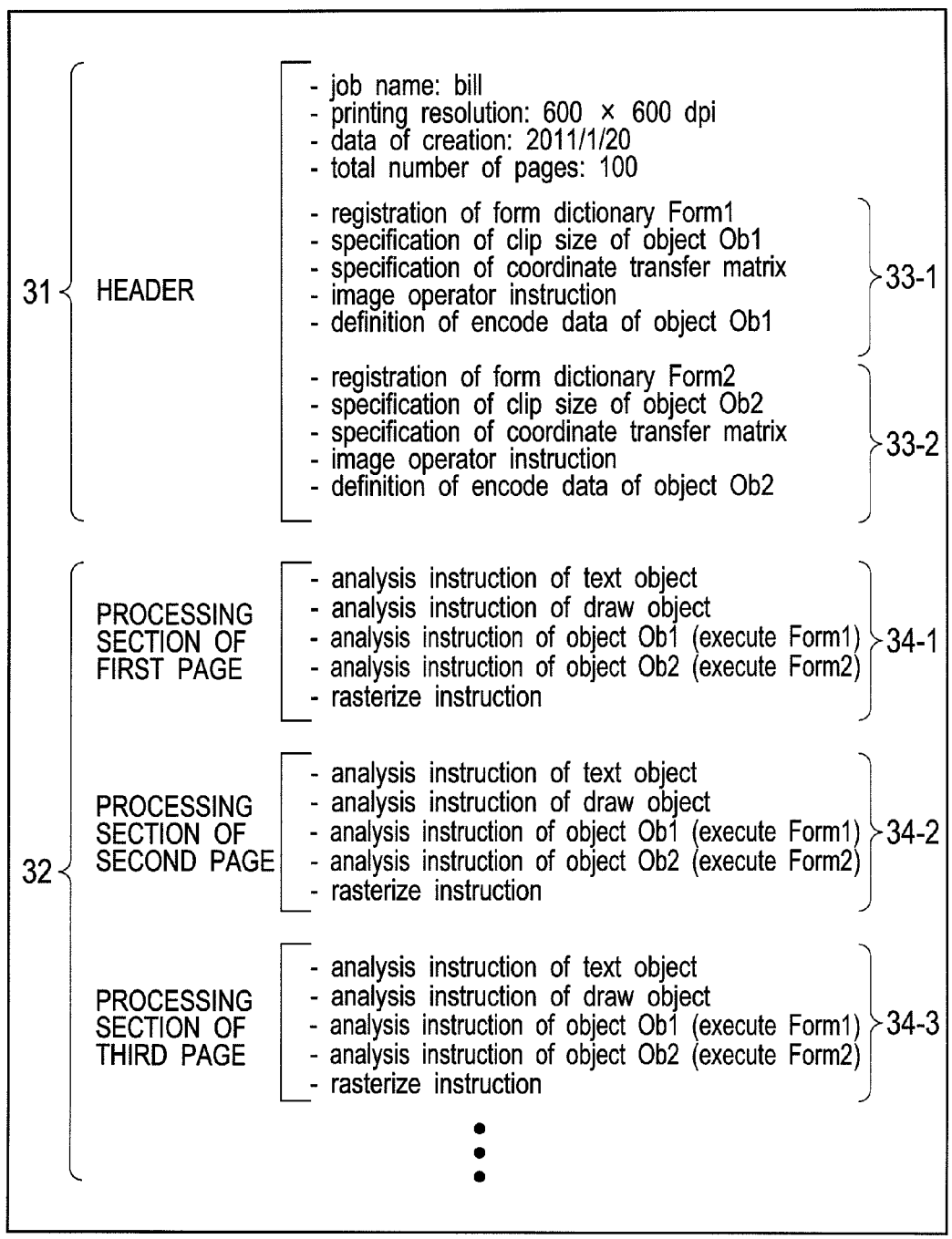
FIG. 6 is a diagram showing an example of contents of a PDL for variable printing.

Here, an example of contents of a PDL for variable printing is shown in FIG. 6. As shown in FIG. 6, the PDL for variable printing has a header 31 and a processing section 32 of each page. The header 31 includes information, such as a print resolution (specified resolution Ra) and the total number of pages. Further, the header 31 includes definition sections 33-1 and 33-2 in which the objects Ob1 and Ob2 of the static part are defined.

The definition section 33-1 of the object Ob1 is implemented by using a form dictionary and in which coordinates with which the object Ob1 is clipped into a rectangular shape are specified, a transfer matrix to map the data of the rectangle of the clipped object Ob1 from a form coordinate space into a user coordinate space is specified, the format to encode the image configuring the object Ob1 and the actually encoded data are defined, the instruction to restore and paint the encoded data is defined, and so on. The contents of the definition section 33-2 of the object Ob2 are the same as those of the definition section 33-1.

In the processing section 32 of each page, analysis instructions and a rasterization instruction for each page are defined. In a processing section 34-1 of the first page, analysis instructions of a text object and a draw object, which are variable parts, analysis instructions of the objects Ob1 and Ob2 of the static part, and a rasterization instruction are defined. Following the processing section 34-1 of the first page, a processing section 34-2 of the second page and a processing section 34-3 of the third page are provided and the configuration of the PDL is such that similar descriptions are repeated until the final page is reached.

In FIG. 6, an example described in the postscript format is shown, but other variable formats may be used, such as PPML (Personalized Print Markup Language) and PDF/VT (Variable data and Transactional printing).

The image data generator 12 determines that the target of printing is a variable document when the definition section of an object of the static part, such as the definition sections 33-1 and 33-2, is found to be included in the header 31 as a result of the analysis of the PDL.

When determining that the target of printing is not a variable document (step S20: NO), at step S30, the image data generator 12 performs image processing for normal printing and generates image data for printing. Specifically, the image data generator 12 generates an intermediate format of the whole of each page based on the PDL and generates bitmap image data in the CMYK format by rasterizing the intermediate format. Then, the image data generator 12 performs multi-level error diffusion processing etc. on the bitmap image data, generates image data for printing, which is drop data, and outputs the image data to the printer 20. Then, the processing is completed.

When determining that the target of printing is a variable document (step S20: YES), at step S40, the image data generator 12 sets one to a variable p indicating the number of pages.

Next, at step S50, the image data generator 12 determines whether or not there is a static part on the p-th page. Specifically, for example, as in FIG. 6, when analysis instructions of the objects Ob1 and Ob2 of the static part described in the header 31 are included in the processing section 34-1 of the first page, the image data generator 12 determines that there is a static part on the first page. Here, in the examples of FIG. 2 and FIG. 6, the objects Ob1 and Ob2 of the static part exist on each page, but, a static part does not necessarily exist on each page. For example, there is a variable document in which a static part exists on every other page.

When determining that there is no static part on the p-th page (step S50: NO), at step S60, the image data generator 12 generates an intermediate format of the whole of the p-th page including only variable parts at the specified resolution Ra, performs processing such as rasterization, and generates image data for printing. After that, the image data generator 12 proceeds to processing of step S120.

When determining that there is a static part on the p-th page (step S50: YES), at step S70, the image data generator 12 determines whether or not static part data is already stored in the static part data storage unit 13. As will be described later, the image data generator 12 issues a unique ID for each object of the static part data when causing the static part data storage unit 13 to store the static part data, and therefore the image data generator 12 determines whether or not the static part data is already stored based on the ID.

When determining that the static part data is not stored in the static part data storage unit 13 (step S70: NO), at step S80, the image data generator 12 calculates the data amount Da of the static part data at the specified resolution Ra. The static part data includes image data of all the objects configuring the static parts and the data amount Da is the total data amount of drop data for printing of each object configuring the static parts. Here, in the present embodiment, it is assumed that the drop data represents the number of drops of ink of each pixel by 3-bit data for each color of CMYK. In this case, the number of drops increases by one each time the number is incremented in the binary number system, such as that "000" represents zero drops, "001" represents one drop, "010" represents two drops, and so on, and seven drops are set at the maximum.

Consequently, for the four colors of CMYK, 3×4=12 bits are necessary for one pixel. Because of this, when it is assumed that the number of pixels of all the objects configuring the static parts at the specified resolution Ra is Ga and eight bits=one byte, the data amount Da is calculated by the following equation:

$$Da = Ga \times 12 \text{ (bits)} = Ga \times 1.5 \text{ (bytes)}. \quad (1)$$

Next, at step S90, the image data generator 12 determines whether or not the data amount Da exceeds the capacity Cth of the static part data storage unit 13.

When determining that the data amount Da is equal to or less than the capacity Cth (step S90: NO), at step S100, the image data generator 12 generates an intermediate format of the whole of the p-th page at the specified resolution Ra, performs processing such as rasterization, and generates image data for printing.

Next, at step S110, the image data generator 12 causes the static part data storage unit 13 to store the static part data, which is the image data of the static parts of the image data of the whole of the p-th page generated at step S100. At this time, the image data generator 12 issues a unique ID for each object of the static part data and causes the static part data storage unit 13 to store the image data of each object of the static part in association with the ID.

Next, at step S120, the image data generator 12 outputs the image data of the whole of the p-th page to the printer 20.

Next, at step S130, the image data generator 12 determines whether or not the variable "p" is "n", which is a value indicating the final page. When determining that p=n (step S130: YES), the image data generator 12 exits the series of processing.

When determining that p is not n (step S130: NO), at step S140, the image data generator 12 adds one to the variable "p". After that, the image data generator 12 returns to the processing of step S50.

At step S90, when determining that the data amount Da exceeds the capacity Cth (step S90: YES), at step S150 of FIG. 4, the image data generator 12 calculates the storage-capable resolution Rb (<Ra). As described previously, in the present embodiment, it is assumed that the X-axis resolution and the Y-axis resolution are the same. In this case, the number of pixels in a region for which the resolution is transferred is proportional to the square of the resolution. Consequently, when the resolution of the image data of all the objects configuring the static parts is transferred from the specified resolution Ra into the storage-capable resolution Rb, the number of pixels changes from Ga to $(Rb/Ra)^2 \times Ga$. As a result of this, a total data amount Db of the image data of all the objects configuring the static parts at the storage-capable resolution Rb is expressed by the following equation:

$$Db = (Rb/Ra)^2 \times Ga \times 1.5 \text{ (bytes)}. \tag{2}$$

Rb is a value that satisfies Db≤Cth (bytes), and therefore calculated as a value that satisfies the following equation:

$$Rb \leq Ra \times (Cth/(Ga \times 1.5))^{1/2}. \tag{3}$$

Next, at step S160, the image data generator 12 determines whether or not the storage-capable resolution Rb is equal to or more than the minimum resolution Rmin at which printing can be performed in the printer 20.

When determining that the storage-capable resolution Rb is equal to or more than the minimum resolution Rmin (step S160: YES), at step S170, the image data generator 12 generates an intermediate format of the static part of the p-th page at the storage-capable resolution Rb, performs processing such as rasterization, and generates static part data After that, the image data generator 12 proceeds to the processing of step S110 described previously.

Figure 7:
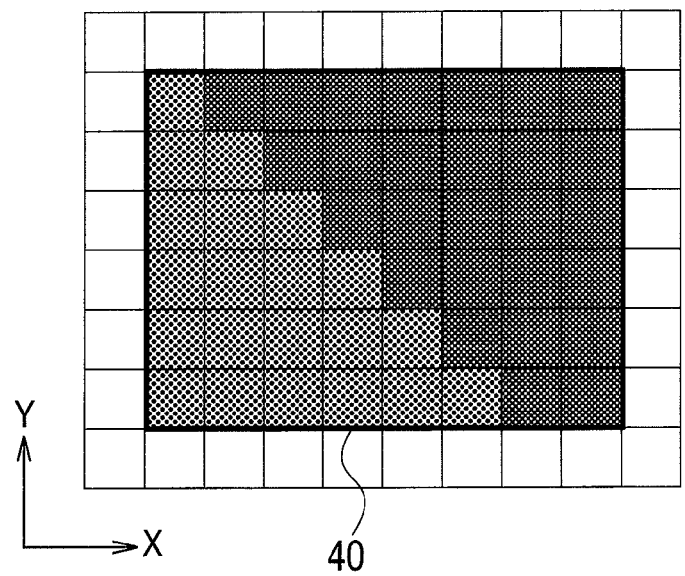
FIG. 7 is a diagram for explaining a change in the resolution of a static part.
Figure 8:
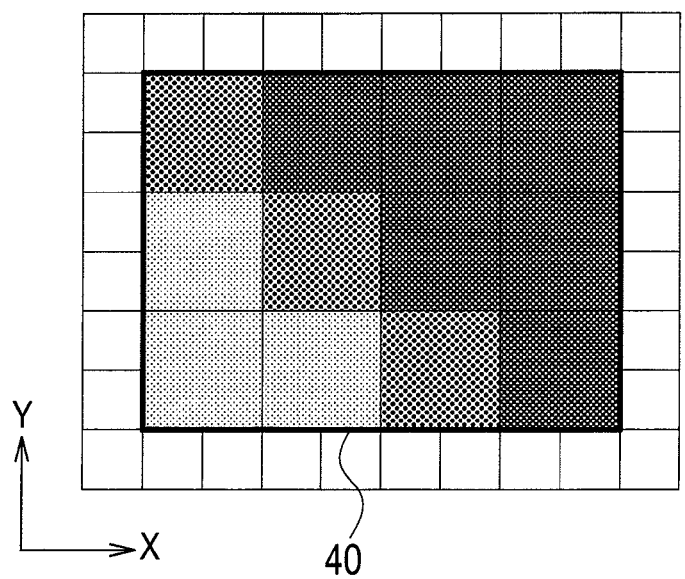
FIG. 8 is a diagram for explaining the change in the resolution of the static part.

FIG. 7 and FIG. 8 are diagrams for explaining the change in the resolution of a static part. FIG. 7 shows a part of an image when the whole including the static part is rasterized at the specified resolution Ra. In FIG. 7, it is assumed that the square represents a pixel and a region 40 is a static part. If only the region 40 of the static part is rasterized at the storage-capable resolution Rb lower than the specified resolution Ra, an image as shown in FIG. 8 is obtained. The density of each pixel within the region 40 of FIG. 8 is the average of the densities of a plurality of corresponding pixels within the region 40 in FIG. 7. In the examples of FIG. 7 and FIG. 8, the storage-capable resolution Rb is ½ of the specified resolution Ra, and therefore the density of each pixel within the region 40 of FIG. 8 is the average of the densities of four corresponding pixels within the region 40 in FIG. 7.

Figure 9:
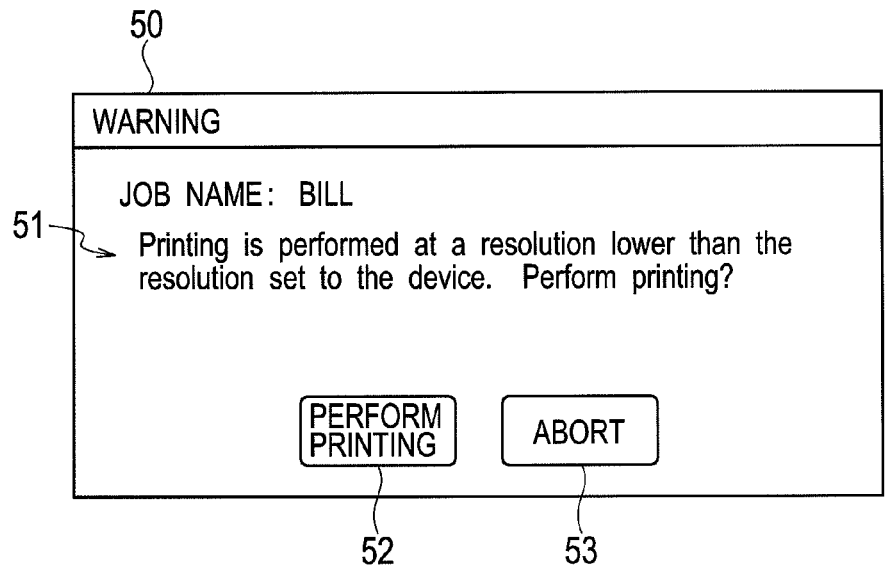
FIG. 9 is a diagram showing an example of a warning screen.

When determining that the storage-capable resolution Rb is less than the minimum resolution Rmin (step S160: NO), at step S180, the image data generator 12 causes the display unit 17 to display a warning screen. An example of a warning screen is shown in FIG. 9. As shown in FIG. 9, on a warning screen 50, a message 51 to notify a user of that the resolution of a print image is lower than the minimum resolution Rmin of the printer 20, a perform printing button 52 to receive an instruction to perform printing by a user, and an abort button 53 to receive an instruction to abort printing are displayed.

Next, at step S190, the image data generator 12 determines whether or not an input operation to the input unit 16 is performed. When an operation signal is input from the input unit 16, the image data generator 12 determines that an input operation is performed. When determining that an input operation is not performed (step S190: NO), the image data generator 12 repeats the processing of step S190.

When determining that an input operation is performed (step S190: YES), at step S200, the image data generator 12 determines whether or not execution of printing is instructed based on the operation signal from the input unit 16.

When determining that the execution of printing is instructed (step S200: YES), the image data generator 12 proceeds to the processing of step S170 described previously. When determining that the abort of printing is instructed instead of the execution of printing (step S200: NO), the series of processing is exited.

On the other hand, at step S70, when determining that the static part data is already stored in the static part data storage unit 13 (step S70: YES), at step S210 of FIG. 5, the image data generator 12 generates an intermediate format of the variable part of the p-th page at the specified resolution Ra, performs processing such as rasterization, and generates variable part data. At this time, the image data generator 12 does not generate static part data.

Next, at step S220, the data merge unit 14 reads out the image data of each object of the static part from the static part data storage unit 13 based on the ID issued at step S110 and merges the image data with the variable part data generated at step S210. Due to this, the image data of the whole of the p-th page is generated by reusing the static part data within the static part data storage unit 13. After that, the image data generator 12 proceeds to step S120 and causes the printer 20 to output the image data of the whole of the p-th page generated in the data merge unit 14.

As explained above, according to the image processing device 10 according to the first embodiment, the image data generator 12 calculates the storage-capable resolution Rb when the data amount Da of the static part data at the specified resolution Ra exceeds the capacity Cth of the static part data storage unit 13. Then, the image data generator 12 changes the resolution from the specified resolution Ra to the storage-capable resolution Rb to generate static part data, and causes the static part data storage unit 13 to store the static part data. Due to this, it is possible for the image processing device 10 to reuse the static part data even when the data amount Da of the static part data at the specified resolution Ra exceeds the capacity Cth and to avoid performing the processing each time, such as rasterization of the static part. As a result of this, it is possible for the image processing device 10 to prevent the efficiency of image processing for variable printing from decreasing.

Further, since in the image processing device 10, the display unit 17 displays the warning screen 50 when the storage-capable resolution Rb is lower than the minimum resolution Rmin of the printer 20, it is possible to notify a user in advance of that the resolution of the print image is reduced.

Furthermore, since in the image processing device 10, the storage-capable resolution Rb is calculated and the static part data at the resolution changed from the specified resolution Ra to the storage-capable resolution Rb is generated, it is possible to deal with a PDL transmitted from any device.

The present embodiment is explained with the assumption that the storage-capable resolution Rb is uniform in the whole of the static part data. However, it may also be possible to change the resolution to which the specified resolution Ra is changed for each object in the static part data. For example, it may be also possible for the image data generator 12 to change the resolution of the objects of "bitmap" and "graphic" of the static parts so that the total data amount of the image data of all objects of the static part is equal to or less than the capacity Cth while keeping the resolution of the object of "text" at the specified resolution Ra. It is possible to determine the kinds of objects (text, bitmap, graphic) from the description of the PDL. Further, it may be also possible for the image data generator 12 to cause the display unit 17 to display a thumbnail image of pages including a static part and to cause a user to select an object at the resolution to be changed. It is possible to adjust the print image quality for each object by changing the resolution to which the specified resolution Ra is to be changed for each object in the static part as described above.

As described above, the method is not limited to the method in which the resolution of all the objects of the static part is changed from the specified resolution Ra to the storage-capable resolution Rb. Therefore any method may be used as long as the resolution of at least part of the objects of the static part is changed. In this case, the image data generator 12 causes the display unit 17 to display the warning screen 50 when the lowest resolution of each object in the static part data with the resolution to be changed is lower than the minimum resolution Rmin of the printer 20.

Further, it may be also possible for the image data generator 12 to omit the change in the resolution of static part data and the storage of static part data in the static part data storage unit 13 and to perform image processing for normal printing when the data amount Da of the static part data at the specified resolution Ra exceeds the capacity Cth and the kind of document of the variable printing data is a document for which image quality is important. That is, in this case, the image data generator 12 generates image data of the whole of each page at the specified resolution Ra and outputs the image data to the printer 20 even if the input is a PDL for variable printing. Due to this, when the kind of the document, such as a flier, is that for which image quality is important the productivity is reduced because the change to reduce the resolution of the static part data is not performed, but the print image quality can be maintained. It is possible to determine the kind of document from, for example, information indicating an application that has originally created the document, included in the header 31 of a PDL.

In order to simplify explanation, the above explanation of the present invention is given on the assumption that the X-axis resolution and the Y-axis resolution are the same. However, the X-axis resolution and the Y-axis resolution are handled independently of each other. For example, it may also be possible for the image data generator 12 to generate static part data with the data amount that is equal to or less than the capacity Cth by changing only one of the X-axis resolution and the Y-axis resolution at the specified resolution when the data amount of the static part data at the specified resolution exceeds the capacity Cth of the static part data storage unit 13. The comparison between the storage-capable resolution in the static part data and the minimum resolution of the printer 20 is made for each of the X-axis resolution and the Y-axis resolution, when the image data generator 12 determines whether or not to cause the display unit 17 to display the warning screen 50. Then, when the storage-capable resolution is lower than the minimum resolution in at least one of the X-axis resolution and the Y-axis resolution, the image data generator 12 causes the display unit 17 to display the warning screen 50.

The above explanation of the present embodiment is given on the assumption that the static part data to be stored in the static part data storage unit 13 is drop data, which is the final image data for printing. However, such a configuration may be used in which the intermediate format of the static part generated from the PDL is stored in the static part data storage unit 13 as the image data of the static part (static part data). In this case, the data merge unit 14 merges the intermediate format of the static part read out from the static part data storage unit 13 and the intermediate format of the variable part (variable part data) generated in the image data generator 12, and then performs processing such as rasterization to generate drop data.

(Second Embodiment)

Figure 10:
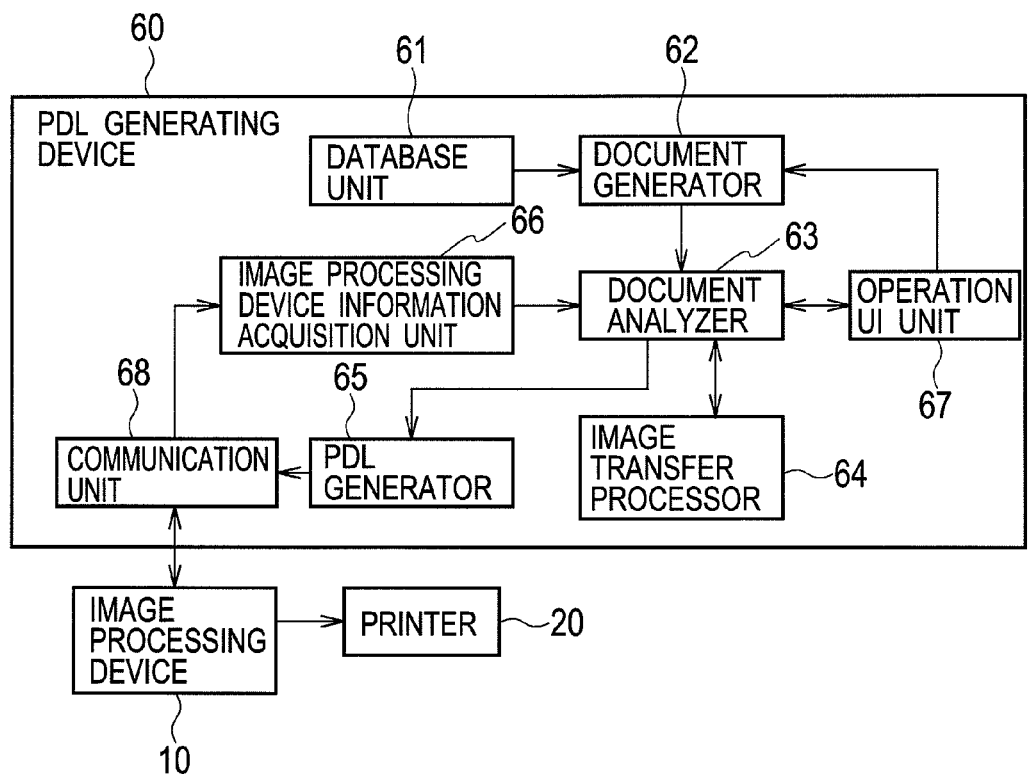
FIG. 10 is a block diagram showing a configuration of a printing system according to a second embodiment.

FIG. 10 is block diagram showing a configuration of a printing system according to a second embodiment. As shown in FIG. 10, the printing system according to the second embodiment includes a PDL generating device 60, the image processing device 10, and the printer 20.

The PDL generating device (host data generating device) 60 is configured to generate document data in accordance with a user operation and generate print data in the PDL format to be transmitted to the image processing device 10 based on the document data The PDL generating device 60 includes a database unit 61, a document generator 62, a document analyzer 63, an image transfer processor 64, a PDL generator 65, an image processing device information acquisition unit 66, an operation UI unit 67, and a communication unit 68.

The database unit 61 is configured to store one or more objects of the static part and one or more objects of the variable part, respectively, which are used to generate variable document data The objects of the static part are, for example, objects such as a logo mark and a photo of an advertised product The objects of the variable part are, for example, "address", objects in "Contents" box, and in "Amount" box, etc in the example of FIG. 2. The printing system may have a configuration in which the database unit 61 is located outside the PDL generating device 60 and communicates with the PDL generating device 60 by a specific protocol.

The document generator 62 is configured to generate document data in accordance with a user operation to the operation UT unit 67. When generating variable document data for variable printing, the document generator 62 acquires objects of the static part and the variable part from the database unit 61 and generates variable document data using these objects.

The document analyzer 63 is configured to analyze document data Further, when the target of printing is variable document data, the document analyzer 63 determines whether or not a data amount Ds of the static part data generated in the image processing device 10 is equal to or less than the capacity Cth of the static part data storage unit 13. Here, in the second embodiment, the static part data stored in the static part data storage unit 13 of the image processing device 10 is assumed to be the intermediate format of objects of the static part generated from the PDL. That is, it is assumed that the data amount Ds of the static part data in the second embodiment is the total data amount of the intermediate format of all the objects of the static part generated from the PDL in the image processing device 10. When the data amount Ds of the static part data exceeds the capacity Cth of the static part data storage unit 13, the document analyzer 63 causes the image transfer processor 64 to perform image transfer processing of the static part in the variable document data.

When the data amount Ds of the static part data described above exceeds the capacity Cth of the static part data storage unit 13, the image transfer processor 64 performs image transfer processing on the static part in the variable document data so that the data amount Ds is equal to or less than the capacity Cth of the static part data storage unit 13. Specifically, the image transfer processor 64 is configured to perform processing to transfer at least one of the resolution and the number of gradations of the object of the static part. As the processing to transfer the number of gradations, for example, halftone processing using the dither matrix and error diffusion algorithm is used.

The PDL generator 65 is configured to generate a PDL based on the result of analysis by the document analyzer 63.

The image processing device information acquisition unit 66 is configured to acquire the capacity Cth of the static part data storage unit 13 of the image processing device 10 via the communication unit 68.

The operation UI unit 67 is configured to provide a user with a user interface to create document data. The operation UI unit 67 has an input unit such as a keyboard and mouse and a display unit configured to display various kinds of screens.

The communication unit 68 is configured to perform communication and data transfer with an external device. The communication unit 68 is configured so as to have, for example, a LAN interface.

The PDL generating device 60 includes a PC including a CPU, RAM, ROM, a storage device such as a hard disk, etc. By the CPU executing programs stored in the storage device such as a hard disk, the functions of the document generator 62, the document analyzer 63, the image transfer processor 64, the PDL generator 65, and the image processing device information acquisition unit 66 are implemented The database unit 61 is configured so as to include a storage device such as a hard disk.

Next, the operation of the PDL generating device 60 is explained.

The document generator 62 generates document data in accordance with a user operation to the operation UI unit 67. In the case of a variable document, the document generator 62 acquires the specified objects of the static part and the variable part from the database unit 61, arranges the objects in specified positions of specified pages, specifies a color space and makes a fine adjustment etc., and thus generates variable document data.

When the start of printing of a document is instructed by a user operation to the operation UI unit 67, the PDL generating device 60 generates a PDL based on the document data.

The operation of the PDL generating device 60 to generate a PDL is explained with reference to the flowchart of FIG. 11.

Figure 11:
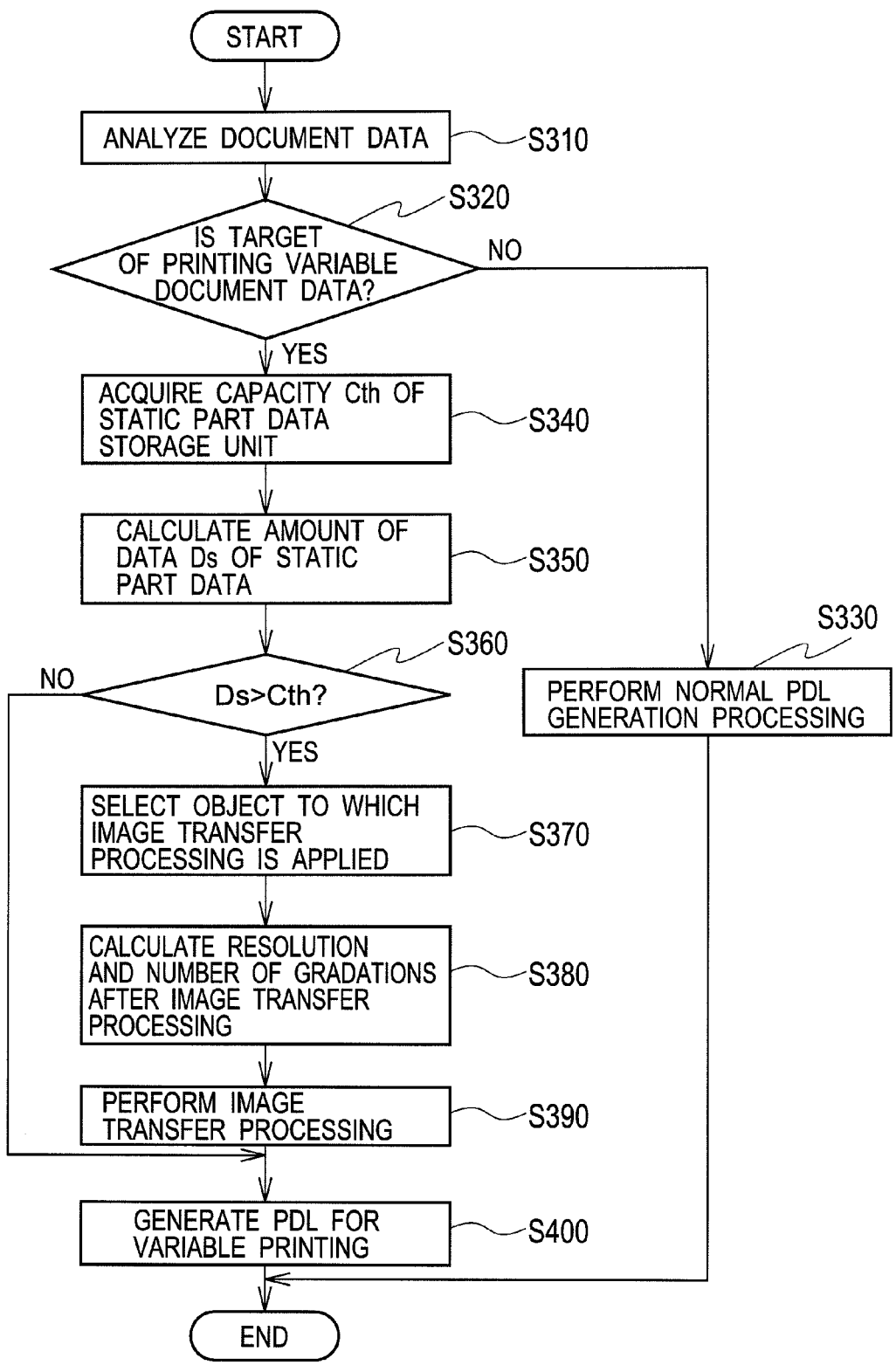
FIG. 11 is a flowchart for explaining an operation of a PDL generating device in the second embodiment.

At step S310 of FIG. 11, the document analyzer 63 analyzes document data of target of printing generated in the document generator 62 and acquires basic information, such as a page configuration, and attribute information of each object (object type, size, layout information, resolution, etc.)

Next, at step S320, the document analyzer 63 determines whether or not the target of printing is variable document data based on the analysis result of the document data Specifically, when determining that there is an object of the static part in the document data from the information acquired at step S310, the document analyzer 63 determines that the target of printing is variable document data.

When determining that the target of printing is not variable document data (step S320: NO), at step S330, the document analyzer 63 causes the PDL generator 65 to perform normal PDL generation processing based on the analysis result of the normal document data, not variable document data The generated PDL is transmitted to the image processing device 10 via the communication unit 68.

When determining that the target of printing is variable document data (step S320: YES), at step S340, the document analyzer 63 acquires the capacity Cth of the static part data storage unit 13 of the image processing device 10. When the PDL generating device 60 and the image processing device 10 are connected via LAN, the image processing device information acquisition unit 66 acquires the capacity Cth from the image processing device 10 using a protocol such as SNMP (Simple Network Management Protocol), and the document analyzer 63 acquires the capacity Cth from the image processing device information acquisition unit 66. When the PDL generating device 60 and the image processing device 10 are not connected via LAN, a user operates the image processing device 10 and acquires the capacity Cth of the static part data storage unit 13. After that, the user inputs the capacity Cth to the operation UT unit 67 of the PDL generating device 60 and the document analyzer 63 acquires the capacity Cth from the operation UI unit 67.

Next, at step S350, the document analyzer 63 calculates the data amount Ds of the static part data generated in the image processing device 10 based on the analysis result of the variable document data As described previously, the data amount Ds is the total data amount of the intermediate format of all the objects of the static part generated from the PDL in the image data generator 12 of the image processing device 10.

Assuming that the area of one object in the variable document data is Sn (in$^2$), the X-axis resolution and the Y-axis resolution are Rs (dpi), the color space is four colors of CMYK, and the number of gradations (bit/pixel) of each color of CMYK is Bs, a data amount Dn of one object is expressed by the following equation:

$$Dn = Sn \times Rs^2 \times 4 \times Bs \text{(bits)} \tag{4}$$
$$= Sn \times Rs^2 \times 0.5 \times Bs \text{(bytes)}$$

where the area Sn is expressed by Sn=Lx×Ly. Here the size of the object in the X-axis direction is Lx (in) and the size in the Y-axis direction is Ly (in).

The data amount Ds is the sum of the data amounts Dn of each object calculated by Equation (4).

Next, at step S360, the document analyzer 63 determines whether or not the data amount Ds exceeds the capacity Cth of the static part data storage unit 13.

When determining that the data amount Ds exceeds the capacity Cth (step S360: YES), at step S370, the document analyzer 63 selects an object of the static part to which image transfer processing is applied. Specifically, the document analyzer 63 causes the operation UI unit 67 to display an object selection screen for a user to select an object of the static part to which image transfer processing is to be applied.

Here, an example of the object selection screen displayed on the operation UI unit 67 is shown in FIG. 12. As shown in FIG. 12, on an object selection screen 70, a document display field 71, an image information display field 72, an image transfer object selection field 73, and a cache percentage specification field 74 are displayed.

In the document display field 71, an image of a document is displayed. In the document display field 71, objects of the static part are displayed so as to be identifiable. For example, as shown in FIG. 12, objects of the static part (objects #1, #2) are enclosed by a dotted line so as to be identifiable.

In the image information display field 72, the resolution and the number of gradations of each object of the static part in the variable document data are displayed.

The image transfer object selection field 73 is for causing a user to select an object to which image transfer processing is to be applied. In the image transfer object selection field 73, a check box 75 for specifying to apply image transfer processing to each object is displayed.

The cache percentage specification field 74 is for causing a user to specify a cache percentage of each object to be subjected to image transfer processing. The cache percentage is a ratio of the magnitude of the data amount of each intermediate format corresponding to each object having been subjected to image transfer processing to be stored (cached) in the static part data storage unit 13. In the cache percentage specification field 74, an input box 76 of the cache percentage of each object is provided.

The document analyzer 63 selects an object of the static part to which image transfer processing is to be applied in accordance with the input contents of the image transfer object selection field 73 of the object selection screen 70.

Next, at step S380, the document analyzer 63 calculates the resolution and the number of gradations after the image transfer processing in each object of target of image transfer processing selected at step S370.

In the static part data storage unit 13 of the image processing device 10, assuming that the total data amount of the intermediate format of each object not of target of image transfer processing is Dsa, an available capacity Cth' for objects of target of image transfer processing is expressed by the following equation:

$$Cth'=Cth-Dsa. \quad (5)$$

Here, assuming that the total area of each object not of target of image transfer processing in the variable document data is Sna (in$^2$), the data amount Dsa is expressed by the following equation:

$$Dsa=Sna \times Rs^2 \times 0.5 \times Bs \text{ (bytes)}. \quad (6)$$

Assuming that a cache percentage specified to a certain object of target of image transfer processing is Wn, a capacity Cn to be allocated to the object in the static part data storage unit 13 is expressed by the following equation:

$$Cn=Cth' \times Wn. \quad (7)$$

Further, assuming that the X-axis resolution and the Y-axis resolution after the image transfer processing in the object are Rs' and the number of gradations is Bs', a data amount Dn' of the object after the image transfer processing is expressed by the following equation:

$$Dn'=Sn \times Rs'^2 \times 0.5 \times Bs' \text{ (bytes)}. \quad (8)$$

Also, assuming that the data amount Dn' is equal to or less than the capacity Cn, Equation (9) and Equation (10) below are derived.

$$Rs' \leq ((2 \times Cn)/(Sn \times Bs'))^{1/2}, \quad (9)$$

$$Bs' \leq (2 \times Cn)/(Sn \times Rs'^2). \quad (10)$$

The document analyzer 63 calculates the resolution Rs' and the number of gradations Bs' after the image transfer processing in each object of target of image transfer processing so as to satisfy Equation (9) or Equation (10).

Next, at step S390, the document analyzer 63 causes the image transfer processor 64 to perform image transfer processing on each object of target of image transfer processing in the variable document data based on the resolution Rs' and the number of gradations Bs' calculated at step S380.

Next, at step S400, the document analyzer 63 causes the PDL generator 65 to generate a PDL for variable printing as shown in FIG. 6 based on the variable document data after the image transfer processing by the image transfer processor 64. The generated PDL is transmitted to the image processing device 10 via the communication unit 68.

The image processing device 10 having received the PDL transmitted from the PDL generating device 60 generates drop data used for printing in the printer 20 from the PDL.

The operation of the image processing device 10 when receiving a PDL for variable printing from the PDL generating device 60 is explained with reference to the flowchart of FIG. 13.

Figure 13:
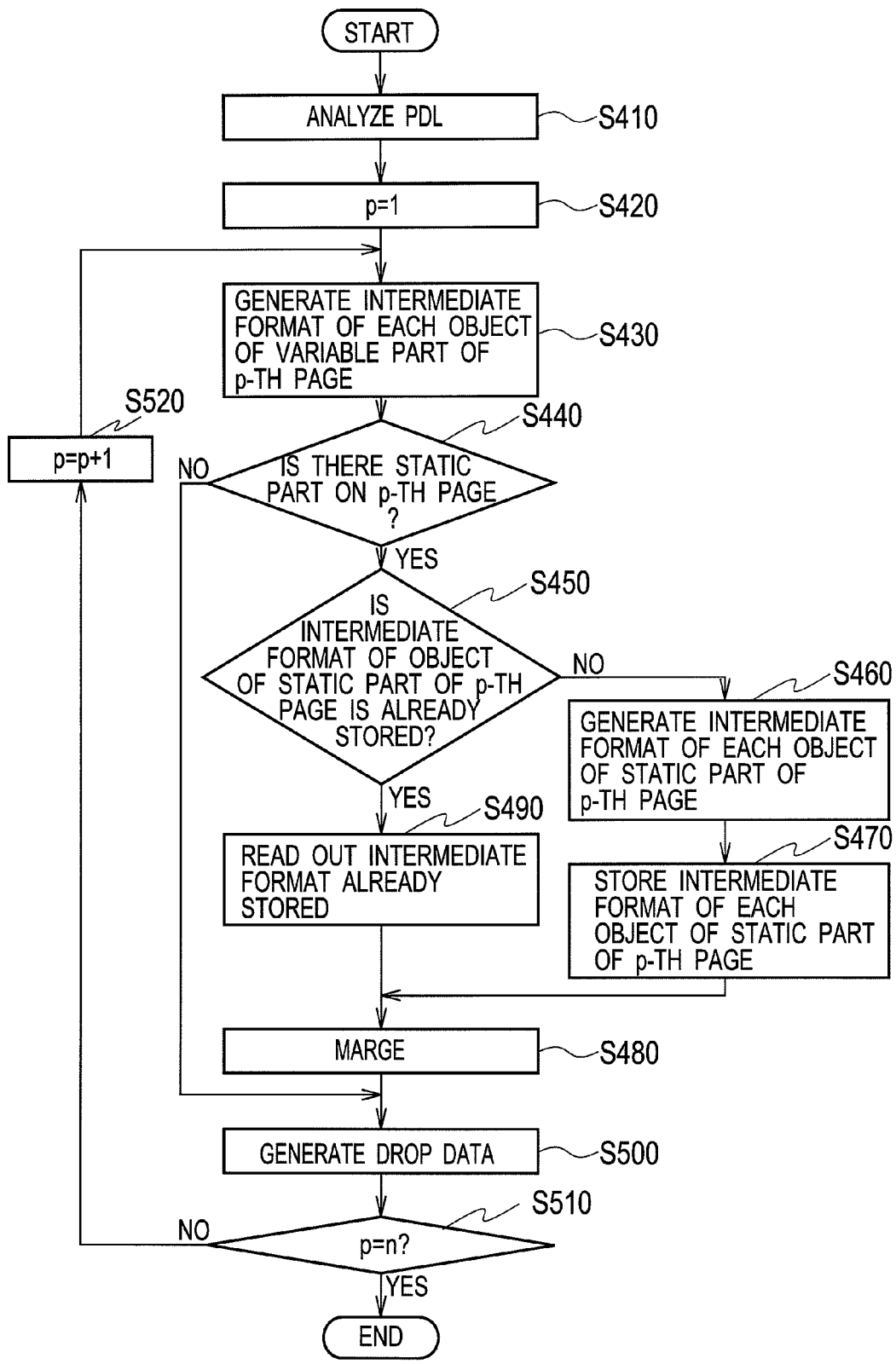
FIG. 13 is a flowchart for explaining an operation of an image processing device in the second embodiment.

When a PDL is input, at step S410 of FIG. 13, the image data generator 12 checks whether or not the input PDL conforms to the syntax of PDL and at the same time, analyzes the PDL and acquires necessary information such as the total number of pages configuring the document.

Next, at step S420, the image data generator 12 sets one to the variable "p" indicating the number of pages.

Next, at step S430, the image data generator 12 generates the intermediate format of each object of the variable part on the p-th page based on the PDL.

Next, at step S440, the image data generator 12 determines whether or not there is a static part on the p-th page based on the PDL.

When determining that there is a static part on the p-th page (step S440: YES), at step S450, the image data generator 12 determines whether or not the intermediate format of the object of the static part on the p-th page is already stored in the static part data storage unit 13. The image data generator 12 determines whether or not the corresponding intermediate format is already stored based on the unique ID issued for each object, as will be described later.

When determining that the intermediate format of the object of the static part on the p-th page is not stored yet (step S450: NO), at step S460, the image data generator 12 generates the intermediate format of each object of the static part on the p-th page based on the PDL.

Next, at step S470, the image data generator 12 causes the static part data storage unit 13 to store the intermediate format of each object of the static part generated at step S460. At this time, the image data generator 12 issues a unique ID for each object and causes the static part data storage unit 13 to store the intermediate format in association with the ID.

Next, at step S480, the data merge unit 14 merges the intermediate format of each object of the variable part on the p-th page generated at step S430 and the intermediate format of each object of the static part on the p-th page generated at step S460. Due to this, the intermediate format of the whole of the p-th page is generated.

On the other hand, at step S450, when it is determined that the intermediate format of the object of the static part on the p-th page is already stored (step S450: YES), at step S490, the data merge unit 14 reads out and acquires the intermediate format already stored in the static part data storage unit 13.

After that, at step S480, the data merge unit 14 merges the intermediate format of each object of the variable part on the p-th page generated at step S430 and the intermediate format of the object of the static part acquired at step S490.

Next, at step S500, the data merge unit 14 generates drop data from the intermediate format of the whole of the p-th page obtained at step S480. Specifically, the data merge unit 14 generates bitmap image data in the CMYK format by rasterizing the intermediate format. After that, the data merge unit 14 performs multi-level error diffusion processing etc. on the bitmap image data and generates drop data The generated drop data is transmitted to the printer 20 via the communication unit 11.

Further, at step S440, when determining that there is no static part on the p-th page (step S440: NO), at step S500, the image data generator 12 generates drop data from the intermediate format of each object of the variable part on the p-th page generated at step S430. The generated drop data is transmitted to the printer 20 via the communication unit 11.

Next, at step S510, the image data generator 12 determines whether or not the variable "p" is "n", which is a value indicating the final page. When determining that p=n (step S510: YES), the image data generator 12 exits the series of processing.

When determining that p is not n (step S510: NO), at step S520, the image data generator 12 adds one to the variable "p". After than, the image data generator 12 returns to the processing of step S430.

As explained above, in the PDL generating device 60 according to the second embodiment, when the data amount Ds of the static part data (intermediate format of the object of the static part) generated in the image data generator 12 of the image processing device 10 exceeds the capacity Cth of the static part data storage unit 13, the image transfer processor 64 performs image transfer processing on the static part in the variable document data so that the data amount Ds is equal to or less than the capacity Cth. Then, the PDL generator 65 generates a PDL based on the variable document data after the image transfer processing. Due to this, it is made possible for the image processing device 10 to cause the static part data storage unit 13 to store the static part data and to reuse the static part data. As a result of this, it is possible for the PDL generating device 60 to prevent the efficiency of image processing for variable printing from decreasing in the image processing device 10. Further, it is possible for the PDL generating device 60 to reduce the file size of the PDL for variable printing, and therefore it is possible to reduce the time required to transfer data to the image processing device 10.

Further, since the image transfer processor 64 performs image transfer processing for each object in the static part, it is possible to adjust the print image quality for each object. For example, it is made possible to perform a flexible operation not to apply image transfer processing to an object for which print image quality is important, but to apply image transfer processing to an object for which image quality is not important.

The above explanation of the second embodiment is given on the assumption that static part data (image data of the static part) to be stored in the static part data storage unit 13 is the intermediate format. However, drop data, which is the final image data for printing, may be stored in the static part data storage unit 13 as static part data.

Further, the explanation of the present embodiment is also given on the assumption that a user is caused to select an object to be subjected to image transfer processing from the object selection screen 70. However, it may be also possible to provide a threshold value in advance to the number of times of appearance and the data amount of the object of the static part and to automatically apply image transfer processing only to the object exceeding the threshold value.

Furthermore, it may be possible to allow a user to specify the resolution and the number of gradations after image transfer processing of an object to be subjected to image transfer processing, and the halftone algorithm (dither matrix, error diffusion algorithm, etc.) that is applied when the number of gradations is changed.

(Third Embodiment)

Figure 14:
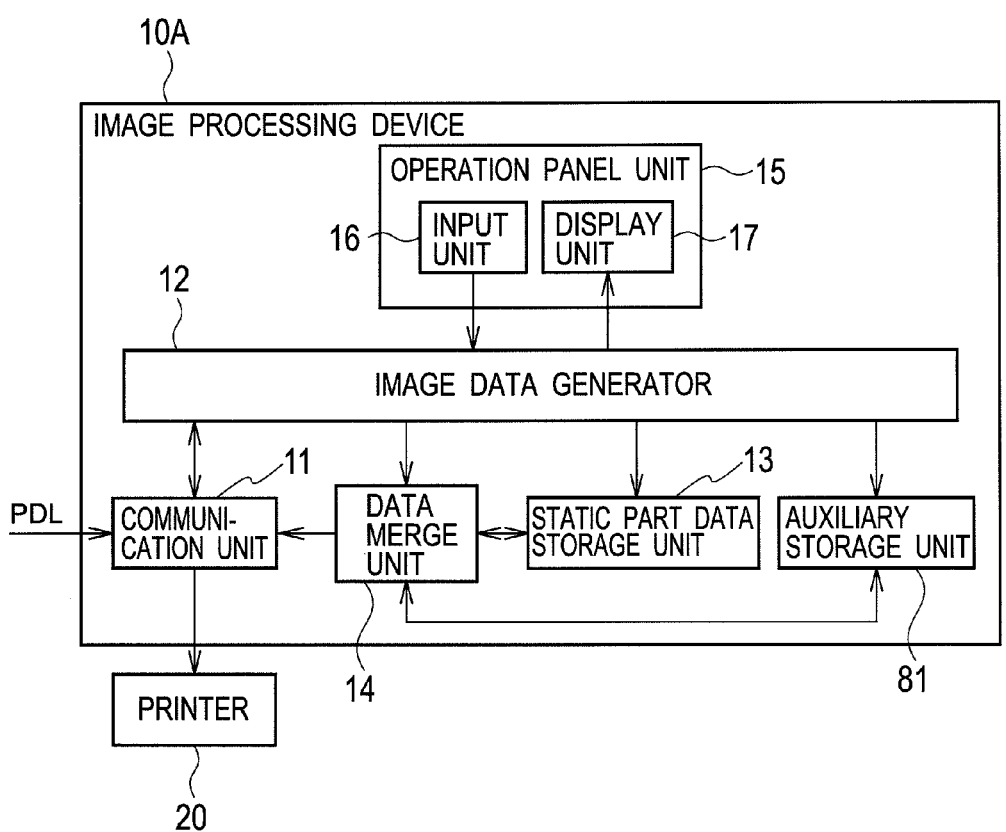
FIG. 14 is a block diagram showing a configuration of a printing system according to a third embodiment.

FIG. 14 is a block diagram showing a configuration of a printing system according to a third embodiment. As shown in FIG. 14, the printing system according to the third embodiment includes an image processing device 10A and the printer 20.

The image processing device 10A has a configuration in which an auxiliary storage unit 81 is added to the image processing device 10 of the first embodiment shown in FIG. 1.

It is possible for the auxiliary storage unit 81 to store at least part of static part data. In other words, it is possible for the auxiliary storage unit 81 to store the image data (static part object data) of at least part of objects in the static part data. The auxiliary storage unit 81 includes a storage device different from that of the static part data storage unit 13. For example, the auxiliary storage unit 81 includes a magnetic storage device such as an HDD (Hard Disk Drive), a flash memory, etc. As a flash memory, it is possible to apply a USB memory, SSD (Solid State Drive), compact flash (registered trademark), etc. The auxiliary storage unit 81 may be incorporated in the image processing device 10A or may be configured to be attachable to and detachable from the image processing device 10A.

The image data generator 12 causes the auxiliary storage unit 81 to store the static part object data that the static part data storage unit 13 cannot store because of capacity shortage.

The data merge unit 14 merges the static part object data stored in the static part data storage unit 13 or in the auxiliary storage unit 81 and the variable part data.

Next, the operation of the image processing device 10A at the time of variable printing is explained with reference to the flowchart of FIG. 15 and FIG. 16. The processing of the flowchart of FIG. 15 and FIG. 16 is started when a PDL for variable printing is input to the image processing device 10A.

Figure 15:
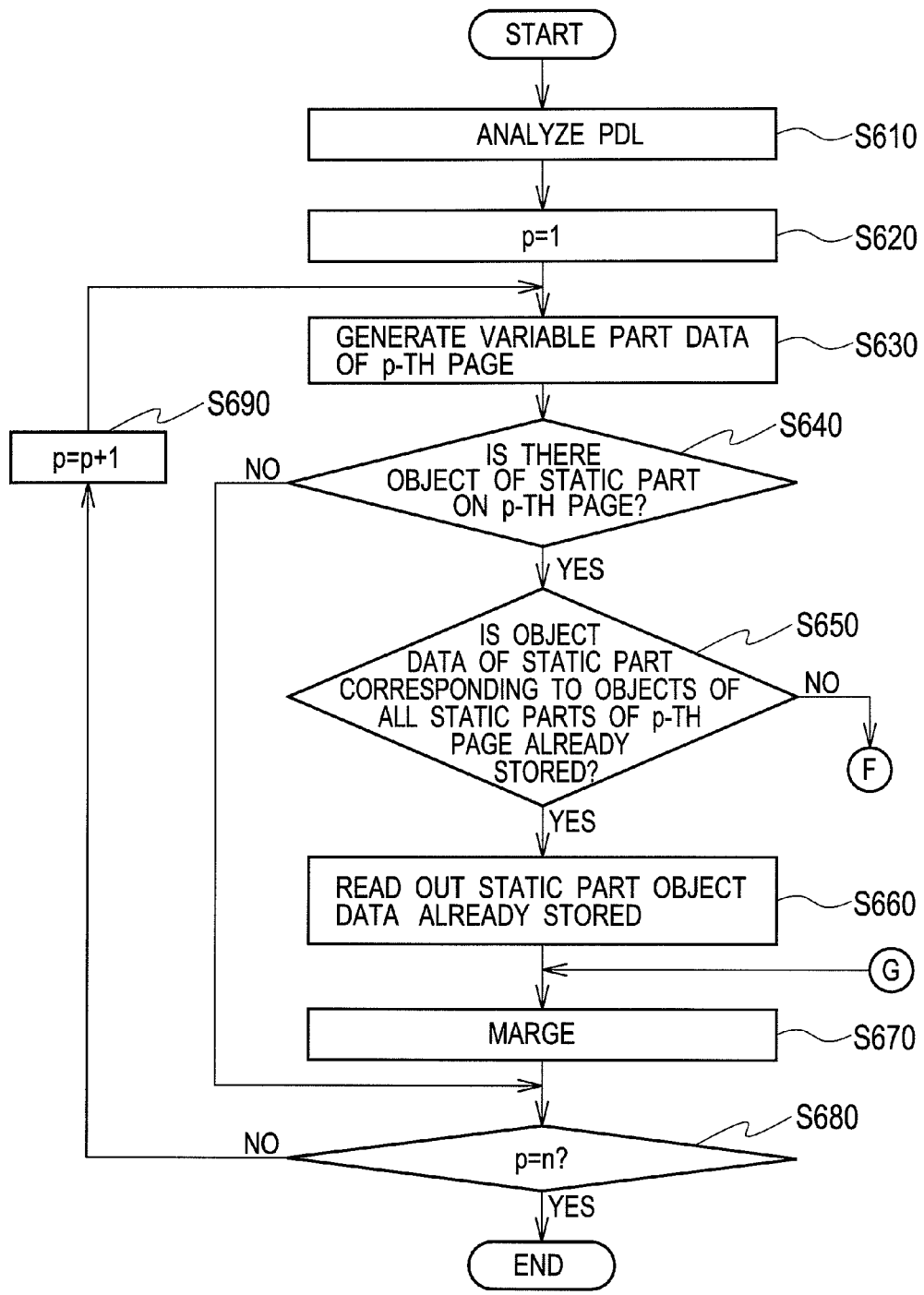
FIG. 15 is a flowchart for explaining an operation of an image processing device in the third embodiment.
Figure 16:
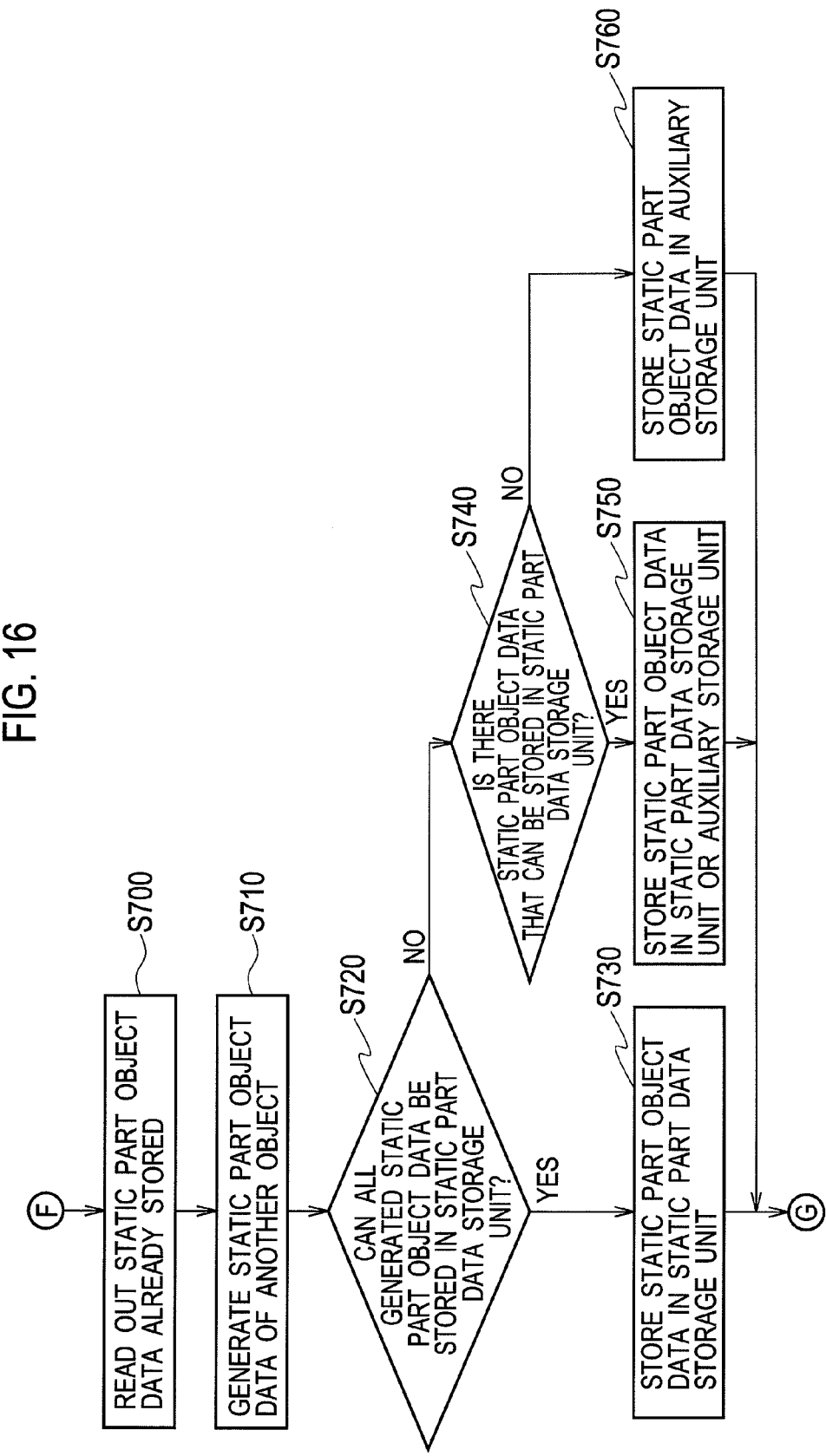
FIG. 16 is the flowchart for explaining the operation of the image processing device in the third embodiment.

At step S610 of FIG. 15, the image data generator 12 checks whether or not the input PDL conforms to the syntax of PDL, analyzes the PDL, and acquires necessary information such as the total number of pages configuring the document.

Next, at step S620, the image data generator 12 sets one to the variable "p" indicating the number of pages.

Next, at step S630, the image data generator 12 generates an intermediate format of each object of the variable part on the p-th page, performs processing such as rasterization, and generates variable part data in the drop data format at the specified resolution Ra based on the PDL.

Next, at step S640, the image data generator 12 determines whether or not there is an object of the static part on the p-th page based on the PDL. Here, it is assumed that there is a case where objects of the static part included in each page are different For example, there is a document where as an object of the static part, only the object Ob1 exists on the first page, the object Ob1 and the object Ob2 exist on the second page, and only the object Ob2 exists on the third page.

When determining that there is no object of the static part on the p-th page (step S640: NO), the image data generator 12 proceeds to step S680, to be described later.

When determining that there is an object of the static part on the p-th page (step S640: YES), at step S650, the image data generator 12 determines whether or not the static part object data corresponding to all the objects of the static part on the p-th page is already stored in the static part data storage unit 13 or in the auxiliary storage unit 81. The image data generator 12 determines whether or not each piece of the static part object data is already stored based on the unique ID issued for each object, as will be described later.

When the image data generator 12 determines that the static part object data corresponding to all the objects of the static part on the p-th page is already stored (step S650: YES), at step S660, the data merge unit 14 reads out and acquires the static part object data already stored from the static part data storage unit 13 or the auxiliary storage unit 81.

Next, at step S670, the data merge unit 14 merges the variable part data of the p-th page generated at step S630 and each piece of the static part object data acquired at step S660. Due to this, the image data (drop data) for printing of the whole of the p-th page is generated. The generated image data is transmitted to the printer 20 via the communication unit 11.

Next, at step S680, the image data generator 12 determines whether or not the variable "p" is "n", which is a value indicating the final page. When determining that p=n (step S680: YES), the image data generator 12 exits the series of processing.

When determining that p is not n (step S680: NO), at step S690, the image data generator 12 adds one to the variable "p". After that, the image data generator 12 returns to the processing of step S630.

On the other hand, at step S650, when it is determined that there is static part object data not stored yet (step S650: NO), at step S700 of FIG. 16, the data merge unit 14 reads out and acquires the already stored static part object data corresponding to the object of the static part on the p-th page from the static part data storage unit 13 or the auxiliary storage unit 81. When there is no already stored static part object data corresponding to the object of the static part on the p-th page, step S700 is omitted.

Next, at step S710, the image data generator 12 generates static part object data of another object of the static part, which is an object for which no corresponding static part object data is stored, of the respective objects of the static part on the p-th page. Specifically, the image data generator 12 generates static part object data, which is image data in the drop data format at the specified resolution Ra, by generating an intermediate format of another object and performing processing such as rasterization, based on the PDL. When there is no already stored static part object data corresponding to the object of the static part on the p-th page, the image data generator 12 generates static part object data corresponding to all the objects of the static part on the p-th page.

Next, at step S720, the image data generator 12 determines whether or not all the static part object data generated at step S710 can be stored in the static part data storage unit 13. Specifically, the image data generator 12 calculates the data amount of each piece of the static part object data generated at step S710.

Here, it is assumed that the static part object data, which is drop data, is 3-bit data representing the number of ink drops of each pixel for each color of CMYK. In this case, when the area of a certain object is assumed to be Sfn, a data amount Dfn of the static part object data is expressed by the following equation:

$$Dfn = Sfn \times Ra^2 \times 12 \text{(bits)} \qquad (11)$$
$$= Sfn \times Ra^2 \times 1.5 \text{(bytes)}.$$

The image data generator 12 finds the data amount Dfn of each piece of the static part object data generated at step S710 and compares a total data amount Dft and an empty capacity Cr of the static part data storage unit 13. Then, when the data amount Dft is equal to or less than the empty capacity Cr, the image data generator 12 determines that all the static part object data generated at step S710 can be stored in the static part data storage unit 13.

When determining that all the static part object data generated at step S710 can be stored in the static part data storage unit 13 (step S720 : YES), at step S730, the image data generator 12 causes the static part data storage unit 13 to store the static part object data. At this time, the image data generator 12 causes the static part data storage unit 13 to store each piece of the static part object data in association with the unique ID issued for each piece of the static part object data.

After this, at step S670, the data merge unit 14 merges the variable part data of the p-th page generated at step S630, each piece of the static part object data acquired at step S700, and each piece of the static part object data generated at step S710. Due to this, the image data for printing of the whole of the p-th page is generated.

At step S720, when determining that at least part of all the static part object data generated at step S710 cannot be stored in the static part data storage unit 13 (step S720: NO), at step S740, the image data generator 12 determines whether or not there is static part object data that can be stored in the static part data storage unit 13. Specifically, the image data generator 12 determines whether or not there is static part object data the data amount Dfn of which is equal to or less than the empty capacity Cr.

When determining that there is static part object data that can be stored in the static part data storage unit 13 (step S740: YES), at step S750, the image data generator 12 causes the static part data storage unit 13 or the auxiliary storage unit 81 to store each piece of the static part object data generated at step S710. Specifically, the image data generator 12 causes the static part data storage unit 13 to store the static part object data that can be stored in the empty capacity Cr of the static part data storage unit 13 and causes the auxiliary storage unit 81 to store the rest of the static part object data. At this time, the image data generator 12 causes the static part data storage unit 13 or the auxiliary storage unit 81 to store each piece of the static part object data in association with the unique ID issued for each piece of the static part object data. After this, the procedure proceeds to step S670 and the same processing as that after step S730 described above is performed.

At step S740, when determining that there is no static part object data that can be stored in the static part data storage unit 13 (step S740: NO), at step S760, the image data generator 12 causes the auxiliary storage unit 81 to store each piece of the static part object data generated at step S710. At this time, the image data generator 12 causes the auxiliary storage unit 81 to store each piece of the static part object data in association with the unique ID issued for each piece of the static part object data. After this, the procedure proceeds to step S670 and the same processing as that after step S730 described above is performed.

As explained above, the image processing device 10A according to the third embodiment includes the auxiliary storage unit 81 and causes the auxiliary storage unit 81 to store the static part object data that the static part data storage unit 13 cannot store because of capacity shortage. Due to this, it is possible for the image processing device 10A to avoid performing processing such as rasterization of an object of the static part, each time by using the auxiliary storage unit 81 even when the capacity shortage occurs only with the static part data storage unit 13. As a result of this, it is possible for the image processing device 10A to prevent the efficiency of image processing for variable printing from decreasing.

(Modification of Third Embodiment)

The operation at the time of variable printing of the image processing device 10A in a modification of the third embodiment is explained with reference to the flowchart of FIG. 17 and FIG. 18. The processing of the flowchart of FIG. 17 and FIG. 18 is started when a PDL for variable printing is input to the image processing device 10A.

Figure 17:
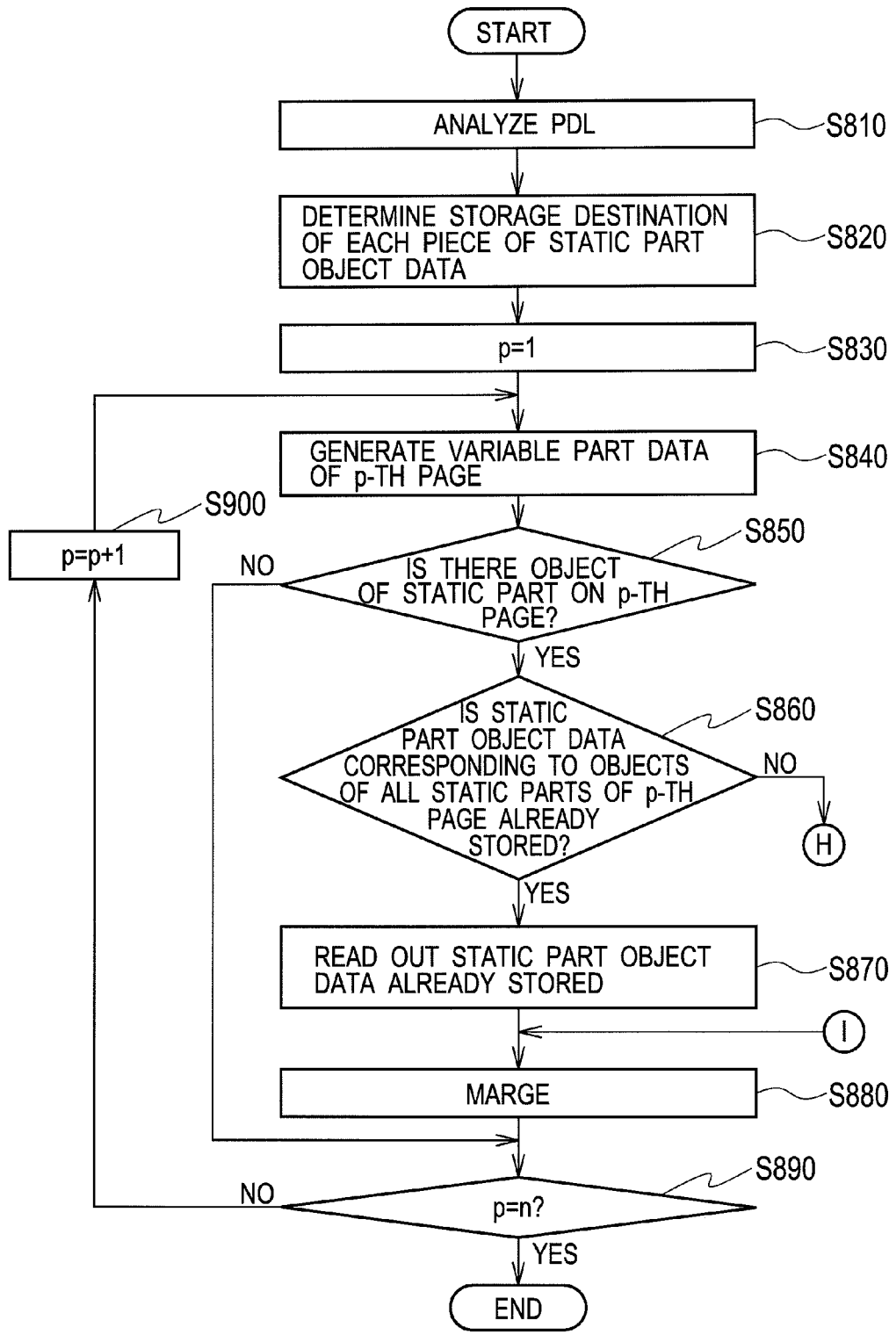
FIG. 17 is a flowchart for explaining an operation of an image processing device in a modification of the third embodiment.
Figure 18:
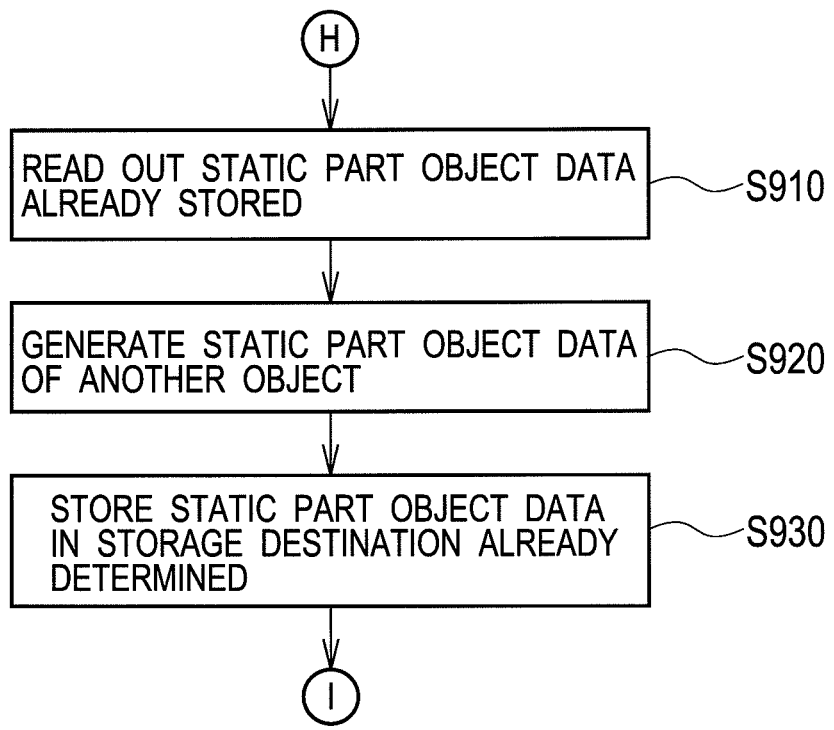
FIG. 18 is the flowchart for explaining the operation of the image processing device in a modification of the third embodiment.

At step S810 of FIG. 17, the image data generator 12 checks whether or not the input PDL conforms to the syntax of PDL, analyzes the PDL and acquires necessary information such as the total number of pages configuring the document.

Next, at step S820, the image data generator 12 determines the storage destination of each piece of the static part object data corresponding to each object of the static part included in the variable document to the static part data storage unit 13 or the auxiliary storage unit 81.

Specifically, the image data generator 12 calculates the data amount Dfn of each piece of the static part object data corresponding to each object of the static part by Equation (11). Here, the image data generator 12 acquires the print resolution (the specified resolution Ra) and the area Sfn of each object necessary to calculate the data amount Dfn of each piece of the static part object data from the analysis result at the step S810. Then, the image data generator 12 determines the storage destination of the static part object data to the static part data storage unit 13 preferentially in the descending order from the static part object data with the largest data amount Dfn. When all the static part object data can be stored in the static part data storage unit 13, the storage destination of all the static part object data is determined to the static part data storage unit 13.

Next, at step S830, the image data generator 12 sets one to the variable "p" indicating the number of pages.

Next, at step S840, the image data generator 12 generates the variable part data of the p-th page as at step S630 of FIG. 15 described previously.

Next, at step S850, the image data generator 12 determines whether or not there is an object of the static part on the p-th page as at step S640 of FIG. 15 described previously. When determining that there is no object of the static part on the p-th page (step S850: NO), the image data generator 12 proceeds to step S890, to be described later.

When determining that there is an object of the static part on the p-th page (step S850: YES), at step S860, the image data generator 12 determines whether or not the static part object data corresponding to all the objects of static part on the p-th page is already stored in the static part data storage unit 13 or in the auxiliary storage unit 81 as at step S650 of FIG. 15 described previously.

When the image data generator 12 determines that the static part object data corresponding to all the objects of static part on the p-th page is stored already (step S860: YES), at step S870, the data merge unit 14 reads out and acquires the static part object data from the static part data storage unit 13 or the auxiliary storage unit 81.

Next, at step S880, the data merge unit 14 merges the variable part data of the p-th page generated at step S840 and each piece of the static part object data acquired at step S870. Due to this, the image data (drop data) for printing of the whole of the p-th page is generated.

Next, at step S890, the image data generator 12 determines whether or not p=n. When determining that p=n (step S890: YES), the image data generator 12 exits the series of processing.

When determining that p is not n (step S890: NO), at step S900, the image data generator 12 adds one to the variable p. After that, the image data generator 12 returns to the processing of step S840.

On the other hand, at step S860, when it is determined that there is static part object data not stored yet (step S860: NO), the processing of steps S910 and S920 of FIG. 18, which is the same as that of steps S700 and S710 of FIG. 16 described previously, is performed.

After step S920, at step S930, the image data generator 12 causes the storage destination already determined at step S820 to store each piece of the static part object data generated at step S920.

After this, at step S880 of FIG. 17, the data merge unit 14 merges the variable part data of the p-th page generated at step S840, each piece of the static part object data acquired at step S910, and each piece of the static part object data generated at step S920. Due to this, the image data for printing of the whole of the p-th page is generated.

As explained as above, in the present modification, the static part data storage unit 13 is caused to store the static part object data preferentially in the descending order from the static part object data with the largest data amount. The static part data storage unit 13 including a RAM has an access speed higher than that of the auxiliary storage unit 81 including a magnetic storage device etc. Because of this, it is possible for the image processing device 10A to prevent the processing efficiency from decreasing by causing the static part data storage unit 13 to store the static part object data preferentially in the descending order from the static part object data with the largest data amount.

It may be also possible to cause the static part data storage unit 13 to store the static part object data corresponding to an object preferentially in the descending order from the object with the highest frequency of appearance in the variable document. Due to this, it is possible to prevent the processing efficiency from decreasing by quickly reading out the static part object data with a high frequency in use for reuse.

The third embodiment and its modification is explained with a configuration in which the image processing device 10A includes one auxiliary storage unit 81. However, another configuration in which the image processing device 10A includes a plurality of the auxiliary storage units 81 may be accepted. With the latter configuration, it is made possible to cover up the capacity shortage of the static part data storage unit 13 by the plurality of the auxiliary storage units 81.

In this case, it may be also possible to adopt storage devices of different kinds as the plurality of the auxiliary storage units 81. Here, when the access speeds of the plurality of the auxiliary storage units 81 differ from one another, it is preferable for the image data generator 12 to use the auxiliary storage unit 81 as the storage destination of the static part object data preferentially in the descending order from the auxiliary storage unit 81 with the highest access speed. For example, when the image processing device 10A includes the two auxiliary storage units 81 in which one includes a USB memory and the other includes an HDD, the image data generator 12 preferentially uses the USB memory having the high access speed as the storage destination of the static part object data. Due to this, it is possible for the image processing device 10A to prevent the processing efficiency from decreasing.

In the third embodiment and its modification, the intermediate format of the static part may be stored as image data in the static part data storage unit 13 and in the auxiliary storage unit 81 as in the first embodiment.

As explained above, according to the image processing device according the above-described embodiments of the present invention, when the data amount of the static part data at the specified resolution exceeds the capacity of the static part data storage unit, the image data generator generates static part data in which the resolution of at least part of the data is changed from the specified resolution so that the data amount is equal to or less than the capacity of the static part data storage unit and causes the static part data storage unit to store the static part data. Due to this, it is possible for the image processing device to reuse the static part data and to avoid performing the processing, such as rasterization of the static part, each time even when the data amount of the static part data at the specified resolution exceeds the capacity of the static part data storage unit. As a result of this, it is possible for the image processing device to prevent the efficiency of image processing for variable printing from decreasing.

According to the image processing device according to the above-described embodiments, by displaying a warning screen when the lowest resolution in the static part data is lower than a predetermined minimum resolution, it is possible to notify a user in advance of that the resolution of a print image is reduced.

According to the image processing device according to the above-described embodiments, by changing the resolution to which the specified resolution is changed for each object in the static part data, it is possible to adjust print image quality for each object in the static part.

According to the image processing device according to the above-described embodiments, when the kind of the document based on the variable printing data is a document for which image quality is important, it is possible to maintain print image quality by omitting the change of the resolution of the static part data and the storage of the static part data in the static part data storage unit and by generating image data of the whole of each page at the specified resolution.

According to the image processing device according to the above-described embodiments, the image data generator causes the auxiliary storage unit to store at least part of the static part data that the static part data storage unit cannot store because of capacity shortage. Due to this, it is possible for the image processing device to avoid performing processing such as rasterization of an object of the static part, each time by using the auxiliary storage unit even when the capacity shortage occurs only with the static part data storage unit. As a result of this, it is possible for the image processing device to prevent the efficiency of image processing for variable printing from decreasing.

According to the image processing device according to the above-described embodiments, the static part data storage unit having the access speed higher than that of the auxiliary storage unit, is caused to store the static part data preferentially in the descending order from the data of the object with the largest data amount, or from the image data of the object with the highest frequency of appearance. Due to this, it is possible for the image processing device to prevent the processing efficiency from decreasing by quickly reading out image data of an object with a large data amount or image data of an object with a high frequency in use.

Further, according to the host data generating device according to the above-described embodiments of the present invention, when the data amount of the static part data generated in the image data generator of the image processing device exceeds the capacity of the static part data storage unit, the image transfer processor performs image transfer processing on the static part in the variable document data so that the data amount of the static part data is equal to or less than the capacity of the static part data storage unit. Due to this, it is made possible for the image processing device to cause the static part data storage unit to store the static part data and to reuse the static part data. As a result of this, it is possible to prevent the efficiency of image processing for variable printing in the image processing device from decreasing.

According to the host data generating device according to the above-described embodiments, since image transfer processing is performed for each object in the static part, it is possible to adjust print image quality for each object.

However, the present invention is not limited to the above-mentioned embodiments as they are. It is possible to embody the present invention by modifying the components within the scope of the present invention in the stage of embodiment. Further, it is possible to form various kinds of inventions by appropriately combining the plurality of components disclosed in the embodiments described above. For example, it may be also possible to remove several components from all the components shown in the embodiments. Further, it may be possible to appropriately combine the components across the different embodiments.

The present application claims the benefit of priority under 35U.S.C. §119 to Japanese Patent Applications No. 2011-139540, filed on Jun. 23, 2011, No. 2011-254901, filed on Nov. 22, 2011, and No. 2012-089199, filed on Apr. 10, 2012, the entire content of which are incorporated herein by reference.

What is claimed is:

1. An image processing device, comprising:
an image data generator configured to generate static part data, which is image data of a static part in a variable document, and variable part data, which is image data of a variable part in the variable document, at a specified resolution based on variable printing data;
a static part data storage memory configured to store the static part data; and
a data merger configured to merge the static part data stored in the static part data storage memory and the variable part data,
wherein the static part data contains one or more objects, and
wherein the image data generator detects when a data amount of the static part data at the specified resolution exceeds a capacity of the static part data storage memory, changes the specific resolution of at least one object in the static part data to a resolution so that the data amount of the static part data is equal to or less than the capacity of the static part data storage memory, and then causes the static part data storage memory to store the static part data.

2. The image processing device according to claim 1, further comprising: a display configured to display a warning screen when a lowest resolution in the static part data is lower than a predetermined minimum resolution.

3. The image processing device according to claim 1,
wherein the image data generator changes a resolution to which the specified resolution is changed for each object in the static part data.

4. A host data generating device that generates variable printing data in a PDL format based on variable document data having a static part and a variable part and transmits the variable printing data to an image processing device, the image processing device having an image data generator configured to generate image data of the static part and the variable part based on the variable printing data and a static part data storage memory configured to store static part data, which is image data of the static part, to reuse the static part data, the host data generating device comprising:
- an image transfer processor configured to detect when a data amount of the static part data generated in the image data generator exceeds a capacity of the static part data storage memory, and perform image transfer processing on at least one object contained in the static part in the variable document data so that the data amount of the static part data is equal to or less than the capacity of the static part data storage memory; and
- a printing data generator configured to generate the variable printing data in the PDL format based on the variable document data after the image transfer processing by the image transfer processor,
- wherein the image transfer processing includes at least one of changing a specified resolution.

5. The host data generating device according to claim 4,
wherein the image transfer processor performs image transfer processing for each object in the static part.

* * * * *